(12) United States Patent
Robell

(10) Patent No.: US 11,963,493 B2
(45) Date of Patent: Apr. 23, 2024

(54) GROW MODULE FOR PLANT VESSELS

(71) Applicant: Maui Greens, Inc., Kula, HI (US)

(72) Inventor: Kevin Robell, Kula, HI (US)

(73) Assignee: MAUI GREENS, INC., Hudsonville, MI (US)

( * ) Notice: Subject to any disclaimer, the term of this patent is extended or adjusted under 35 U.S.C. 154(b) by 196 days.

(21) Appl. No.: 17/575,977

(22) Filed: Jan. 14, 2022

(65) Prior Publication Data

US 2022/0225575 A1    Jul. 21, 2022

Related U.S. Application Data

(60) Provisional application No. 63/252,533, filed on Oct. 5, 2021, provisional application No. 63/252,525, filed
(Continued)

(51) Int. Cl.
*A01G 9/029* (2018.01)
*A01C 23/04* (2006.01)
(Continued)

(52) U.S. Cl.
CPC .......... *A01G 9/0297* (2018.02); *A01C 23/042* (2013.01); *A01G 7/045* (2013.01);
(Continued)

(58) Field of Classification Search
CPC ...... A01G 9/249; A01G 9/023; A01G 27/003; A01G 9/0297; A01G 9/246; A01G 31/042;
(Continued)

(56) References Cited

U.S. PATENT DOCUMENTS

| 4,505,068 A | 3/1985 | Kaneko |
| 5,022,182 A | 6/1991 | Anderson |

(Continued)

FOREIGN PATENT DOCUMENTS

| CN | 203646206 U | 6/2014 |
| CN | 111937731 A | 11/2020 |

(Continued)

OTHER PUBLICATIONS

PCT/US 22/12466_International Search Report and Written Opinion_ dated Jun. 27, 2022.

(Continued)

*Primary Examiner* — Monica L Perry
*Assistant Examiner* — Megan J Moroney
(74) *Attorney, Agent, or Firm* — Rowan TELS LLC

(57) ABSTRACT

A grow module, a plant growing system, and methods for using the same are disclosed herein. The grow module comprises a plurality of tray modules including a light tray over a growing tray. The light tray includes a lighting array and at least one sensor. The growing tray is adapted to hold a plurality of plant vessels. The grow module comprises a machine-readable identification. The grow module is configured to hold the plurality of tray modules in a vertically stacked configuration. The lighting array on the light tray is configured to provide light to the plurality of plant vessels on the growing tray in the grow module directly under said light tray.

12 Claims, 26 Drawing Sheets

Related U.S. Application Data on Oct. 5, 2021, provisional application No. 63/236,512, filed on Aug. 24, 2021, provisional application No. 63/138,391, filed on Jan. 15, 2021, provisional application No. 63/138,389, filed on Jan. 15, 2021.

(51) Int. Cl.
| | | |
|---|---|---|
| *A01G 7/04* | (2006.01) | |
| *A01G 9/02* | (2018.01) | |
| *A01G 9/24* | (2006.01) | |
| *A01G 27/00* | (2006.01) | |
| *A01G 29/00* | (2006.01) | |
| *H05B 45/10* | (2020.01) | |
| *H05B 47/105* | (2020.01) | |

(52) U.S. Cl.
CPC ........... *A01G 9/023* (2013.01); *A01G 9/0299* (2018.02); *A01G 9/247* (2013.01); *A01G 9/249* (2019.05); *A01G 27/003* (2013.01); *A01G 29/00* (2013.01); *H05B 45/10* (2020.01); *H05B 47/105* (2020.01)

(58) Field of Classification Search
CPC . A01G 7/045; A01G 9/02; A01G 9/00; A01G 9/26; A01G 9/24; A01G 9/028; A01G 9/247; A01C 23/03; A01C 23/023
See application file for complete search history.

(56) References Cited

U.S. PATENT DOCUMENTS

| | | | |
|---|---|---|---|
| 5,212,904 | A | 5/1993 | Green et al. |
| 5,557,881 | A | 9/1996 | Bouldin et al. |
| 6,973,885 | B2 | 12/2005 | Fulgham |
| 9,345,201 | B2 * | 5/2016 | Sakura .................. A01G 9/083 |
| 10,939,623 | B2 | 3/2021 | Miyahara et al. |
| 11,483,988 | B2 | 11/2022 | Bertram et al. |
| 11,533,858 | B2 * | 12/2022 | Laeske .................. A01G 9/246 |
| 11,589,520 | B2 * | 2/2023 | Ingram-Tedd ....... A01G 9/1423 |
| 11,617,309 | B2 | 4/2023 | Spiro |
| 11,622,512 | B2 * | 4/2023 | Chong .................. A01G 9/249 47/59 R |
| 11,684,025 | B2 | 6/2023 | Ouammi et al. |
| 11,723,318 | B2 | 8/2023 | Rubin et al. |
| 11,778,957 | B2 | 10/2023 | Jung et al. |
| 2004/0049974 | A1 | 3/2004 | Poirier et al. |
| 2008/0110088 | A1 | 5/2008 | Brusatore |
| 2012/0060416 | A1 | 3/2012 | Brusatore |
| 2012/0124904 | A1 | 5/2012 | Marchildon |
| 2012/0218750 | A1 | 8/2012 | Klase et al. |
| 2012/0324788 | A1 | 12/2012 | Sakura et al. |
| 2013/0127329 | A1 | 5/2013 | Komada et al. |
| 2014/0366443 | A1 | 12/2014 | Brusatore |
| 2015/0027049 | A1 | 1/2015 | Bijl et al. |
| 2015/0223418 | A1 | 8/2015 | Collins et al. |
| 2016/0295820 | A1 | 10/2016 | Aykroyd et al. |
| 2017/0099791 | A1 | 4/2017 | Joseph et al. |
| 2017/0135290 | A1 | 5/2017 | Sahni et al. |
| 2018/0035625 | A1 | 2/2018 | Lindbo et al. |
| 2018/0235156 | A1 | 8/2018 | Blair et al. |
| 2018/0359938 | A1 | 12/2018 | Millar et al. |
| 2019/0133063 | A1 | 5/2019 | Bateman et al. |
| 2019/0159415 | A1 | 5/2019 | Bertram et al. |
| 2019/0191517 | A1 | 6/2019 | Adams et al. |
| 2019/0246571 | A1 | 8/2019 | Ingram-Tedd et al. |
| 2019/0380283 | A1 | 12/2019 | Chong |
| 2020/0214228 | A1 | 7/2020 | Cho et al. |
| 2020/0229357 | A1 | 7/2020 | Spiro |
| 2020/0236883 | A1 | 7/2020 | Ambrosi |
| 2020/0260673 | A1 | 8/2020 | Travaglini |
| 2020/0281129 | A1 | 9/2020 | Anderson et al. |
| 2020/0367455 | A1 | 11/2020 | Vesty |
| 2020/0383277 | A1 | 12/2020 | Tyink |
| 2021/0127593 | A1 | 5/2021 | Krijn et al. |
| 2021/0185937 | A1 | 6/2021 | Ashdown et al. |
| 2021/0259160 | A1 | 8/2021 | Marder-Eppstein et al. |
| 2022/0192114 | A1 | 6/2022 | Lee et al. |
| 2023/0148499 | A1 | 5/2023 | Fujisawa et al. |

FOREIGN PATENT DOCUMENTS

| | | |
|---|---|---|
| WO | 2018208686 A1 | 11/2018 |
| WO | 2019025317 A1 | 2/2019 |
| WO | 2019074549 A1 | 4/2019 |
| WO | 2020018993 A1 | 1/2020 |
| WO | 2021055257 A1 | 3/2021 |

OTHER PUBLICATIONS

PCT/US2022/012451 International Search Report, dated Mar. 29, 2022 entire document.
PCT/US2022/012451 Written Opinion of the International Searching Authority, dated Mar. 29, 2022 entire document.
PCT/US2022/012483 International Search Report, dated Apr. 1, 2022 entire document.
PCT/US2022/012483 Written Opinion of the International Searching Authority, dated Apr. 1, 2022.
PCT/US2022/012547 International Search Report, dated Mar. 29, 2022 entire document.
PCT/US2022/012547 Written Opinion of the International Search Report, dated Mar. 29, 2022 entire document.
PCT/US2022/012574 International Search Report, dated Mar. 29, 2022 entire document.
PCT/US2022/012574 Written Opinion of the International Searching Authority, dated Mar. 29, 2022 entire document.

* cited by examiner

GROW MODULE FOR PLANT VESSELS

CROSS-REFERENCE TO RELATED APPLICATIONS

This application claims the benefit of U.S. Provisional Patent Application No. 63/252,525, filed Oct. 5, 2021, the benefit of U.S. Provisional Patent Application No. 63/252,533, filed on Oct. 5, 2021, the benefit of U.S. Provisional Patent Application No. 63/236,512, filed on Aug. 24, 2021, the benefit of U.S. Provisional Patent Application No. 63/138,391, filed on Jan. 15, 2021, and the benefit of U.S. Provisional Patent Application No. 63/138,389, filed on Jan. 15, 2021, each of which is incorporated herein by reference in its entirety.

BACKGROUND

The inherent difficulties of growing, maintaining, and shipping large individual quantities of edible plant matter are sufficiently extensive that the field doesn't have a particularly strong record of innovation. Mistakes at any point in the growing, maintaining, and/or shipping process(es) often instantly lead to unusable products, with no possibility of recovery or regeneration. In short, the methods and apparatus for growing, maintaining, and shipping large individual quantities of edible plant matter impose requirements of precision wholly unknown in most other industries. Each individual stage for the methods and apparatus imposes its own separate challenges.

Existing methods of storing, maintaining, and monitoring plants and seeds or seedlings pose a number of challenges. "Plant" in this disclosure refers to a living organism of the kind exemplified by trees, shrubs, herbs, grasses, ferns, and mosses, typically growing in a permanent site, absorbing water and inorganic substances through its roots, and synthesizing nutrients in its leaves by photosynthesis. "Seed" in this disclosure refers to a flowering plant's unit of reproduction, capable of developing into another such plant. "Seedling" in this disclosure refers to a young plant, especially one raised from seed and not from a cutting. Storage devices for plants seeds or seedlings in quantity are often quite limited in adapting to variable plant growth, e.g., as plants grow larger, storage devices often cannot re-size their shelving or other organizational means on the basis of individual plants or collections thereof. Devices don't adapt to plant growth; rather, larger plants simply go into larger (or more widely spaced) devices. Plant maintenance in storage devices is also often overlooked, as said devices lack the means to provide effective light and circulating air needed for all plant growth. Since storage devices don't easily adapt to plant growth throughout a complete cycle, e.g., from germination to finishing, monitoring plants or collections of plants for various conditions as well as capturing images of said plants becomes difficult as plants grown sorted in a storage device according to varying criteria (e.g., size) may need commensurately different monitoring criteria. Finally, the means of moving plants between a plant storage device and a means of fertigating said plants extracted from said device is often labor-intensive and prone to mistakes as to the precise fertigation needs of individual plants. "Fertigation system" in this disclosure refers to a system used to inject fertilizers and nutrients, used for soil amendments, water amendments and other water-soluble products into an irrigation system. The fertigation system may also inject water and/or nutrients into plant vessels.

Existing fertigation systems also encounter several challenges when attempting to fertigate a large quantity of plants, each plant or group of plants at differing growth stages—from seeds or seedlings to shoots to plants—and thereby requiring differing quantities of water, nutrients, air, and so on. "Water" in this disclosure refers to $H_2O$. The water may be freshwater, grey (i.e., reclaimed) water, or may include dissolved nutrients and/or minerals. "Nutrients" in this disclosure refers to the solid (e.g., non-liquid and non-gaseous) chemical elements, including nitrogen, phosphorus, calcium, and potassium, essential to the nourishment of plant health. Plants grow at differing rates and use a combination of customized liquid, solid and gaseous nutrients if they are to reach their full growth potential. Plants growing in large collections may need monitoring at all growth stages, not least to adjust their fertigation needs as they mature. Individual plants, regardless of the scale at which they are grown and maintained, also need more than soil, water, light, and nutrients, though all four are important. The locations of these components and the timing schedule at which they are delivered to a growing plant are additionally important for plant growth.

Existing vessels for growing individual plants in large quantities exhibit several obstacles to successfully delivering packaged edible products. These obstacles include effectively delivering water and nutrients to the plants and controlling the climate conditions around the plant given the potential interactions between the plant and the growing medium as well as the interaction of the growing medium with the surroundings within the microclimate. Additional obstacles include protection against harsh handling when the plants are distributed, evaporation, effective watering of the growing medium, etc.

A need therefore exists for both a method and system for controlling, storing, feeding, efficiently growing, monitoring and delivering individually secured and maintained edible plant products.

BRIEF SUMMARY

A grow module is disclosed comprising a plurality of tray modules including a light tray over a growing tray. The light tray includes a lighting array and at least one sensor. The growing tray is adapted to hold a plurality of plant vessels. The grow module comprises a machine-readable identification. The grow module is configured to hold the plurality of tray modules in a vertically stacked configuration. The lighting array on the light tray is configured to provide light to the plurality of plant vessels on the growing tray in the grow module directly under said light tray.

A method of growing plants, seeds, or seedlings, is also disclosed. A fertigation system is used to extract a growing tray comprising plant vessels from the disclosed grow module. The fertigation system includes a tray movement system for extracting the growing tray from the grow module and placing the growing tray back into the grow module. The fertigation system further includes a tray elevator for lowering and raising the growing tray, a first pump in fluid communication with at least one of a fresh water supply and a nutrient/water mixture, and a nozzle manifold in fluid communication with at least one of the first pump, the fresh water supply, and the nutrient/water mixture. The nozzle manifold comprises a manifold header and at least one nozzle in fluid communication with the manifold header, wherein the at least one nozzle is configured to inject at least one of the fresh water supply and the nutrient/water mixture supplied by the first pump into the plant vessels on the growing tray. The plant vessels include plants, seeds or seedlings and a substrate in a root zone. The method next includes raising or lowering the growing tray toward the plurality of nozzles. The method then includes injecting at least one of nutrients, and the fresh water supply into plant vessels. The method concludes with placing the growing tray back into the grow module.

A plant growing system is disclosed, comprising a plurality of plant vessels, comprising an impervious outer vessel including a substrate in a root zone, a cover over the impervious outer vessel, a pervious membrane in contact with the substrate, a nutrient chamber including nutrients, wherein the nutrient chamber is between the cover and the pervious membrane, and the nutrients are in contact with the pervious membrane, and a pocket allowing a seed or seedling access to the substrate through an aperture in the cover and the pervious membrane. The plant growing system further comprises the previously described grow module, further including at least one fan and at least one power supply, the growing tray adapted to hold a plurality of plant vessels, a grow module base, a machine-readable identification on the light tray, and a grow rack configured to rest on the grow module base, the grow rack configured to hold the plurality of tray modules in a vertically stacked configuration. The plant growing system further includes the previously described fertigation system.

Finally, disclosed herein is a method of growing plants, seeds or seedlings, using the system described above, the method beginning with using a fertigation system to extract a growing tray comprising plant vessels from a grow module. Next the growing trays are raised or lowered toward the plurality of nozzles. At least one of nutrients and the fresh water supply are injected into the nutrient chamber without puncturing the cover. The method concludes with placing the growing tray back into the grow module.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
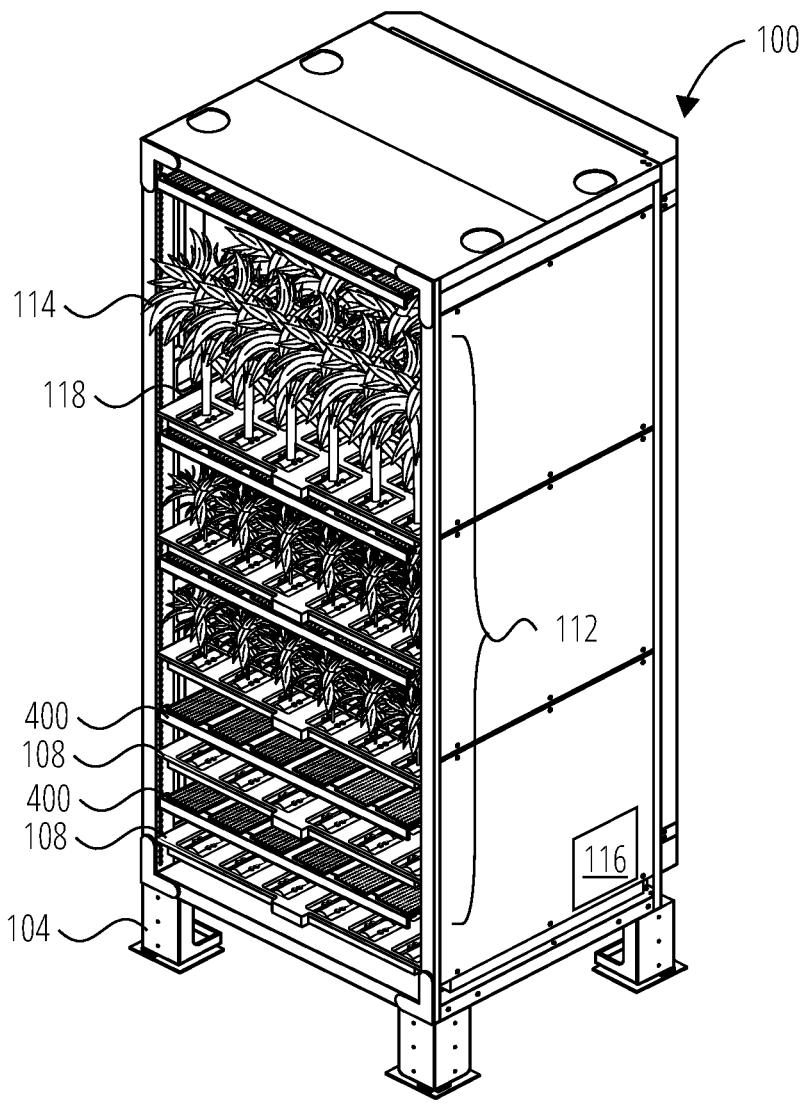
FIG. 1A and FIG. 1B illustrate a grow module 100 in accordance with one embodiment.

This disclosure is directed to a grow module for a plurality of charged plant vessels.

An efficient method of storing and monitoring packaged edible products has proven elusive over time. Yet a storage device for said products capable of providing spatially efficient storage customized to individually growing plants (or seeds or seedlings) may have clear advantages over devices needing to be constantly reconfigured as plant growth changes. Extraction and replacement of products from storage devices introduces its own difficulties: even when accomplished systematically (e.g., through some automated process), the means of fertigating the extracted plants—in whatever form—is usually considered a separate procedure—that is, plants are either stored or fertigated but the needs of each process are considered independently. Finally, though all plants take certain elements to grow, i.e., light and air, storage devices lack the means of providing said elements as said devices are often optimized for other purposes, e.g., transport. The methods employed for storing edible products for transport also typically obviate the need to monitor said products, at least to any great detail, within a storage device itself.

The successful fertigation of packaged edible products in a systematized manner also presents a number of challenges. Fertigating specific individual plants, seeds or seedlings may be optimal as they grow and mature at different rates and often need individual attention—but such attention may be burdensome and impractical for the number of plants typically contained in a system of packaged edible products. Monitoring the growth of individual plants, or even small collections, may also be preferable to inspecting (visually or otherwise) a large group. Controlling the precise combination of water, nutrients, and air needed for a small collection of plants effectively loses its ability to customize delivery of said elements when that small collection scales up to hundreds or thousands of plants.

Existing fertigation systems take a "broad brush" approach to these challenges. Plants are fertigated on a large scale, with little attention paid to the growth needs of individual, or a small collection of, plants. Fertigation control follows this uniform approach, with some plants receiving a larger or smaller quantity of water, nutrients, and/or air than they might otherwise use at a specific growth stage simply because the growth needs of plants in nearby proximity are different. Growth monitoring necessarily scales up as well, with evaluation of plant maturation systematically ignoring outliers.

The identified problems and their solutions for a fertigation system are related to the storing, feeding and growing a scalable number of plants. Plants may be fertigated individually or at least in small groups. The delivery of water, nutrients, air and/or other elements may be customized and injected directly into plant vessels specifically designed to receive said delivery. Monitoring the growth process for individual plants may leverage the latest innovations in visual imagery capture and processing.

Existing vessels for growing individual plants in large quantities also exhibit several obstacles to the successful delivery of packaged edible products. The location of nutrients (e.g., fertilizing matter to feed the plant supplementing access to soil, water and air) may be effectively sealed from the plant itself, as direct exposure to raw nutrients inhibits its growth. Water may be carefully and precisely fed to said nutrients, with an additional means for the water and nutrients to reach the substrate in which the plant roots grow. The vessels may be effectively standardized in shape and composition to allow predictable delivery as described. And finally, the entire vessel may be compostable, as re-use of the vessel may not be otherwise feasible given other constraints.

The identified problems and their solutions for a plant vessel in the fertigation system are related to the storing, feeding and growing a scalable number of plants. First, providing a permeable separation between a deposit of plant nutrients and an area where seeds are initially planted allows for precise amounts of said nutrients to be delivered to a plant or set of plants. Also, calibrating the amounts of water and nutrients needed by a scalable number of plants, keeping the plant shoots and nutrients physically separated, and providing a system that delivers water to plant nutrients, and an area where seeds are initially planted, or some combination thereof based on plant type and fertigation need, is provided by this disclosure. Additionally, configuring an end-to-end system for supplying the fertigation system with water and nutrients and controlling same for a scalable number of plants in a grow module has solutions provided below.

The vessel containing the plants using such a method and apparatus utilizes two chambers, containing nutrients and substrate respectively, with a pervious membrane separation allowing water to transfer from one to the other. The vessel includes a means for water to be injected into its nutrient chamber in precisely measured quantities. The plant itself may be effectively shielded from the raw nutrients. The entire vessel may be a standardized shape to fit into a grow module tray for a growing plant to be held in position for water, air and light delivery. Additionally, the vessel may be compostable.

Figure 1B:
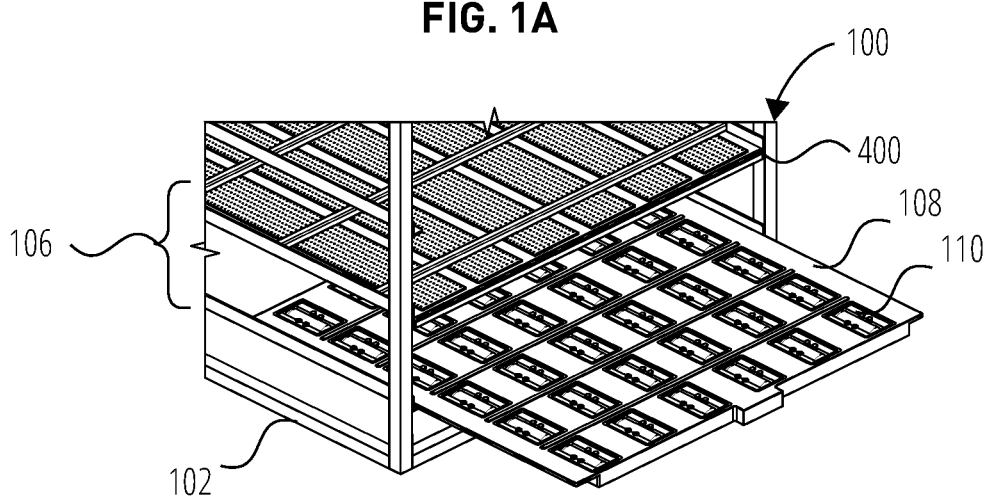

FIG. 1A and FIG. 1B illustrate a grow module 100 in accordance with one embodiment. "Grow module" in this disclosure refers to a storage medium for a plurality of growing trays to be extracted and inserted by the fertigation system. The grow module 100 may include a grow rack 102, a grow module base 104, tray modules 106 in a vertically stacked configuration 112, each comprising a growing tray 108 containing plant vessels 110, in which seeds, seedlings, shoots of plants, and/or plants 114 in various stages of development may be grown, and a light tray 400 arranged above each growing tray 108, to provide light to growing plants within the grow module 100, and a machine-readable identification 116. "Shoots of plants" in this disclosure refers to new growth from seed germination that grows upward and where leaves will develop. Shoots may also refer to stems including their appendages, the leaves and lateral buds, flowering stems and flower buds.

Grow Module

The grow module 100 is a storage assembly for a plurality of growing trays 108 to be extracted and inserted by the fertigation system. The grow module 100 may be made of any metal, plastic, or other solid material of sufficient strength to hold the requisite number of growing trays 108 and withstand repeated interaction with a tray movement system. In one embodiment the grow module 100 includes protruding shelves from the sides of its vertically oriented sides for the purpose of holding a plurality of growing trays 108 and light trays 400 or fixed trays, within a grow module 100. In one embodiment the grow module 100 contains non-removable fixed trays at pre-determined vertical locations within the grow module 100, each fixed tray including a lighting array and at least one power supply for said lighting and other electrical components. "Power supply" in this disclosure refers to one or more electrical or other power sources capable of providing electrical power to at least one sensor and at least one fan.

The lighting array in this case may be provided by any suitable type of light source capable of producing a desired light spectrum and intensity to facilitate plant growth, examples of which include light emitting diodes (LED) and fluorescent, but are not limited thereto. The grow module 100 may also include a source of air (i.e., air flow) for the seeds, seedlings, shoots of plants, and/or plants 114 growing in the grow racks within through at least one fan fixed to the back of the fixed tray and powered by at least one power supply in the fixed tray. In one embodiment, the at least one fan may be fixed to the back of the grow module 100 and controlled and powered by a grow module 100 control system and power supply, or some other configuration. In one embodiment the operation of at least one fan may vary according to their location, e.g., air may be supplied to a subset of the plants 114 in growing trays 108 within the grow module 100. In one embodiment, the number of growing trays 108 in a grow module 100 may also vary according to the growth stage of the various plants, seeds or seedlings, and/or shoots of plants in the grow racks 102 and growing trays 108 within the grow module 100.

Grow Rack

The apparatus encompassing each grow module 100 may comprise a grow rack 102, generally described as an outer frame into which the other components of the grow module 100, as described above, are configured. Said components may comprise light trays 400 or fixed trays with at least one fan, at least one power supply, and a light source for lighting, a grow module base 104, and a variable number of growing trays 108 containing a plurality of plant vessels 110 including seeds, seedlings, shoots of plants, and/or plants 114 in varying stages of development. The grow rack 102 may be made of any material of sufficient strength to hold the requisite number of growing trays 108, additionally holding a plurality of plant vessels 110, and the requisite number of light trays 400 holding lighting arrays, or, alternately, fixed trays holding a light source, at least one fan and at least one power supply, e.g., reinforced plastic, metal, 3D printed material and so on. The grow rack may also be able to be molded into a skeletal frame for air circulation and light spacing from the previously mentioned at least one fan and light source, respectively.

Grow Module Base

"Grow module base" in this disclosure refers to a support for a grow rack or grow module. The grow module base 104 may comprise a physical support onto which the grow module 100 or grow rack 102 may rest, or may rest when removed from a larger collection of grow modules 100. The grow module base 104 may serve, in part, the functions of supporting and stabilizing a grow module 100 or grow rack 102 comprising growing trays 108 or tray modules 106 as an individual growing tray 108 is extracted from the grow module 100 and moved by the tray movement system to the fertigation system. The grow module base 104 may be made of any non-reactive material of sufficient strength to support a single grow module 100, e.g., molded metal(s) or plastic, when said grow module 100 contains the highest allowable number tray modules 106, i.e., light trays 400 or fixed trays including at least one fan, at least one sensor, at least one power supply and lighting array, and growing trays 108 with a plurality of plant vessels 110 containing plants, seeds or seedlings, and/or shoots of plants. In some embodiments, the grow module base 104 may be incorporated into the grow rack 102. If the grow module base 104 is incorporated into the grow rack 102, it may be optionally removable.

Machine-Readable Identification

The grow module 100 may include a machine-readable identification 116 directly attached to it for the purpose of allowing a facility control system to identify the grow module 100 as needing to be moved around the facility for fertigation, cleaning, light tray adjustment, or other purposes. In one embodiment the machine-readable identification 116 comprises a radio frequency identification (RFID) device or a Near Field Communication (NFC) device. In another embodiment the machine-readable identification 116 comprises a printed graphic symbol or group of symbols, e.g., quick response (QR) code or bar code, also known as readable by a scanning red LED, laser light, or similar scanning device. In one embodiment the machine-readable identification 116 may be a sticker affixed to the grow module 100 in a location (e.g., on the side) easily accessible by a reader of said machine-readable identification 116.

FIG. 1B illustrates in more detail a tray module 106 comprising a light tray 400 and a growing tray 108 holding plant vessels 110 within a grow module 100. The growing tray 108 is shown in the process of removal from the grow module 100 or, in some embodiments, grow rack 102.

Tray Module

"Tray module" in this disclosure refers to a plant growing apparatus within a grow module comprising in one embodiment a light tray and a growing tray. In another embodiment, the tray module may comprise a fixed tray and a growing tray. A tray module 106 within each grow module 100 may comprise both a growing tray 108 and a light tray 400 or fixed tray, forming a pair of shelves attached to the grow module 100. In one embodiment a grow module 100 may comprise a plurality of tray modules, as multiple growing trays 108 and light trays 400, and may be included in a single grow module 100 in a vertically stacked configuration 112. "Vertically stacked configuration" in this disclosure refers to any arrangement of components at substantially right angles to a horizontal plane; in a direction, or having an alignment, such that the top is directly or approximately above the bottom.

In one embodiment each tray module comprises the growing tray 108 with a plurality of plant vessels 110 containing plants, seeds or seedlings, and/or shoots of plants and a light tray 400 or fixed tray including at least one fan, at least one sensor, at least one power supply and lighting array. The lighting array and at least one sensor may be positioned on the light tray or fixed tray directly above the plants, seeds or seedlings, and/or shoots of plants in plant vessels positioned in a growing tray 108. The tray module may be made of materials comprising those of the growing tray 108 and light tray, i.e., a solid material sufficiently rigid in composition, e.g., tempered metal or plastic, to hold a plurality of plant vessels 110 without bending or warping for the former, and for the latter, a solid material sufficiently rigid in composition to hold the above named components of the light tray 400 or fixed tray and be attached to the grow module 100 by any means, including but not limited to, bolting, soldering, etc. In some embodiments, the light tray 400 or fixed tray may be removed from the grow rack to facilitate servicing any attached items, such as the at least one fan, at least one sensor, at least one power supply, and lighting array.

Growing Tray

"Growing tray" in this disclosure refers to a plane of solid material sufficiently rigid in composition, e.g., tempered metal or plastic, to hold a plurality of plant vessels without bending or warping. In some embodiments, the shape of the growing tray is square or rectangular. The growing tray may be configured with cutouts to accommodate tray inserts for holding plant vessels, or to accommodate rigid plant vessels not needing rigid tray insert supports. The growing tray 108 may comprise a square or rectangular plane of solid material sufficiently rigid in composition, e.g., tempered metal or plastic, to hold a plurality of plant vessels without bending or warping. Rectangular shaped trays are shown, but any shape may be used, such as round or elliptical shapes. The growing tray 108 additionally may be comprised of a material able to be die cut in a specific pattern so that a plurality of plant vessels may be both inserted vertically into the tray and slid horizontally to lock into place in precisely aligned rows and columns, the latter being useful to align each plant vessel in a grow rack above the plurality of nozzles in the fertigation system. In one embodiment, the growing tray 108 may also include a die cut notch, latch or other physical indentation by which the tray movement system may be assisted in extracting, raising/lowering, and/or replacing the growing tray 108 to and from the grow module 100.

The light tray 400 and growing tray 108 may be adjustably mounted using attachment and support hardware 118 within the grow module 100, allowing flexible spacing of elements within the grow module 100, by any means, including but not limited to, bolting, soldering, etc., as is well understood in the art. In one embodiment, a plurality of growing trays 108 may be included in each grow module 100, the number of growing trays 108 varying according the growth rate(s) of the plants 114 in each growing tray 108. This may allow plants 114 at different stages of growth to be accommodated within a single grow module 100, and may further allow lighting to be provided from a light tray 400 at a variable height above each growing tray 108 in order to optimally light each plant within the growing tray 108.

Normally, the light tray 400 or a fixed tray may remain affixed within the grow module 100. It may be removed or moved within the grow module 100 as needed to provide light at an appropriate height above the growing tray 108 it resides over. This height may be smaller when plant vessels 110 contain seeds or seedlings, and may be increased as these grow into shoots of plants and mature plants 114. In one embodiment, the light tray 400 may be replaced by a fixed tray including at least one fan, at least one sensor, at least one power supply and lighting array. In some embodiments, the light tray 400 or fixed tray may be removed from the grow module 100 for maintenance purposes, particularly maintenance involving any items attached to these trays. In one embodiment, the growing tray 108 and light tray 400 together may constitute a tray module.

Figure 2:
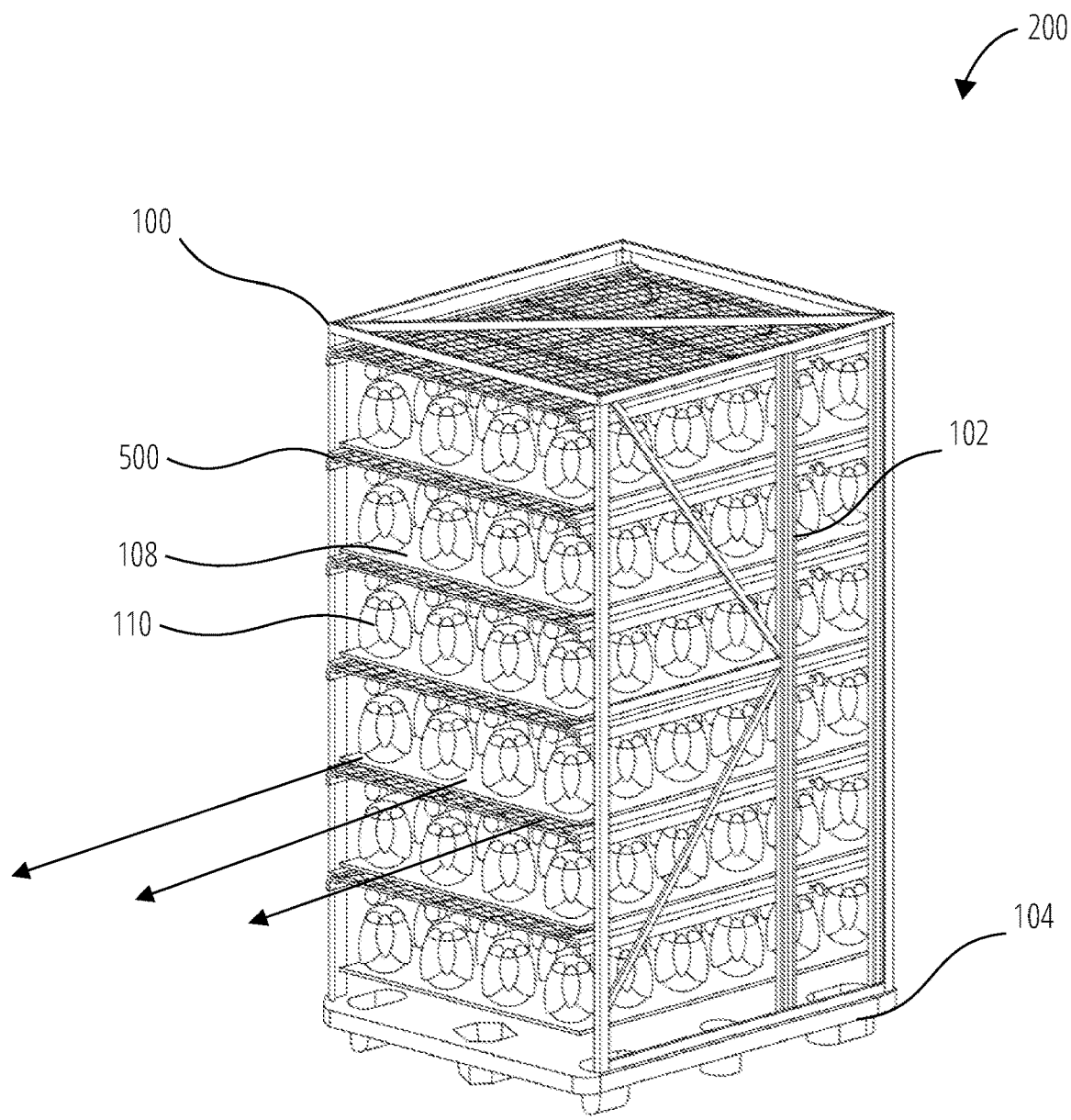
FIG. 2 illustrates a grow module showing growing tray direction 200 in accordance with one embodiment.

Referring to FIG. 2, a grow module showing growing tray direction 200 is illustrated. In one embodiment a grow module 100 comprises a grow rack 102 on a grow module base 104. In the illustrated embodiment, the grow rack 102 may limit the removal of a growing tray 108 containing a plant vessel 110 to a single horizontal dimension, e.g., by using an encasing pattern designed to prevent lateral movement and allow a tray movement system a single horizontal access point. In this case, the growing tray 108 may be extracted from the grow module 100 by the tray movement system and transferred to the fertigation station as described above. Each fixed tray with growing tray 600 located within the grow rack 102 may be optimally oriented, e.g., its affixed lighting array and other components as described below, aligned above the plant vessels 110 in the growing tray 108 directly beneath the fixed tray with growing tray 600.

Figure 3:
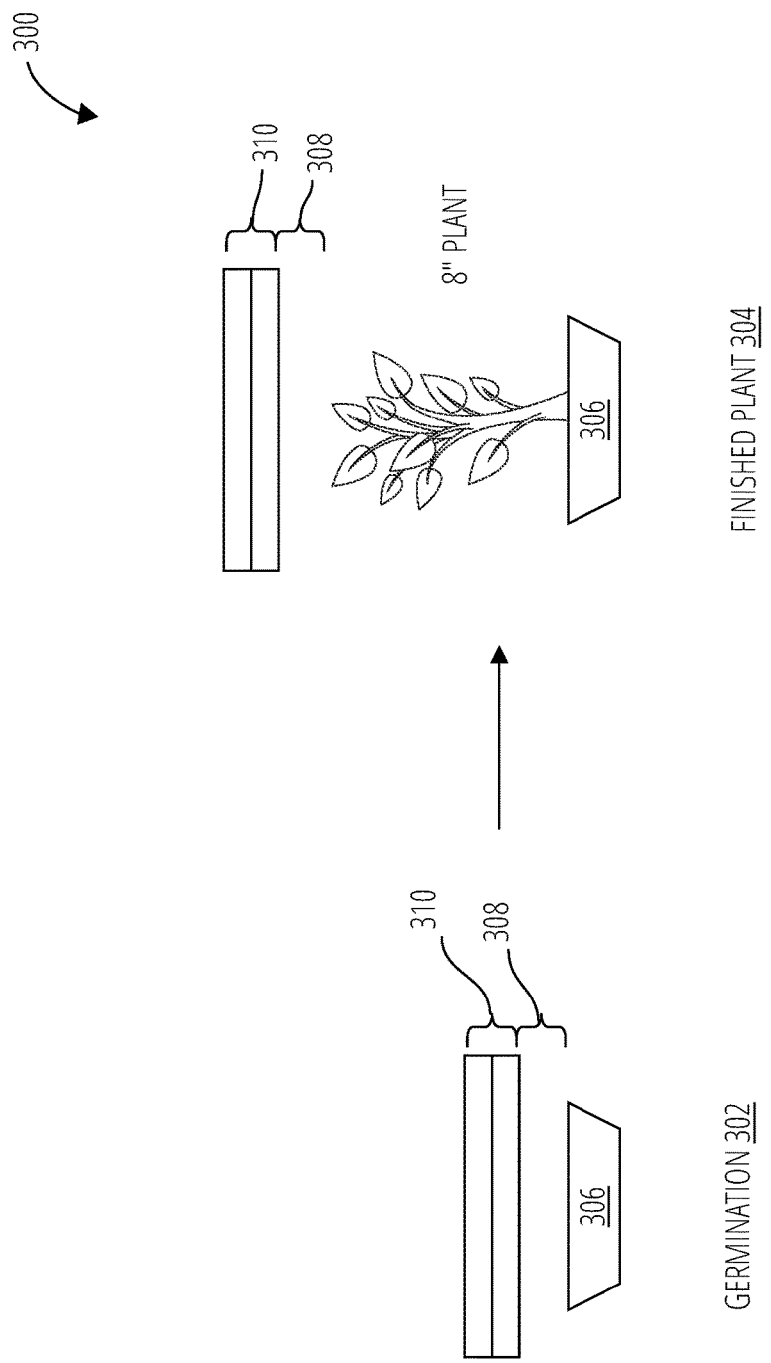
FIG. 3 illustrates a spacing for exemplary finished and germinating plants in the grow module 300 in accordance with one embodiment.

Referring to FIG. 3, spacing for exemplary finished and germinating plants in the grow module 300 is illustrated. As noted earlier in this disclosure, plants at various stages of growth—from germination 302 to finished plant 304—need differing amounts of vertical space for the plants themselves as they grow between their respective 2" plant vessels 306 and the lighting array affixed to the light trays. Exemplary seeds or seedlings at germination 302 have not crested the aperture of the 2" plant vessel 306 and may take up an exemplary 2" air space 308 between the 2" air space 308 and the 2" grow lights 310 extending vertically downward from the light tray to which they are affixed. An exemplary finished plant 304 may take 8 inches of vertical space once the plant or shoot has crested through an aperture of the plant vessel. Taking into account the 2" grow lights 310 extending vertically downward from the light tray to which they are affixed and 2" air space 308, at least 10 inches of vertical space may be needed to account for exemplary plant growth and air space between the plant and the vertically descending lighting array. In one embodiment the vertical spacing for individual plants within the grow module, e.g., how far below a light tray each growing tray may be located to accommodate plant growth, may be determined by the control system. In some embodiments, the grow rack may have rails at different heights, configured to receive a growing tray, thereby allowing the vertical spacing to be adjusted by simply sliding the growing tray into a different set of rails under the light tray in the grow rack.

Figure 4A:
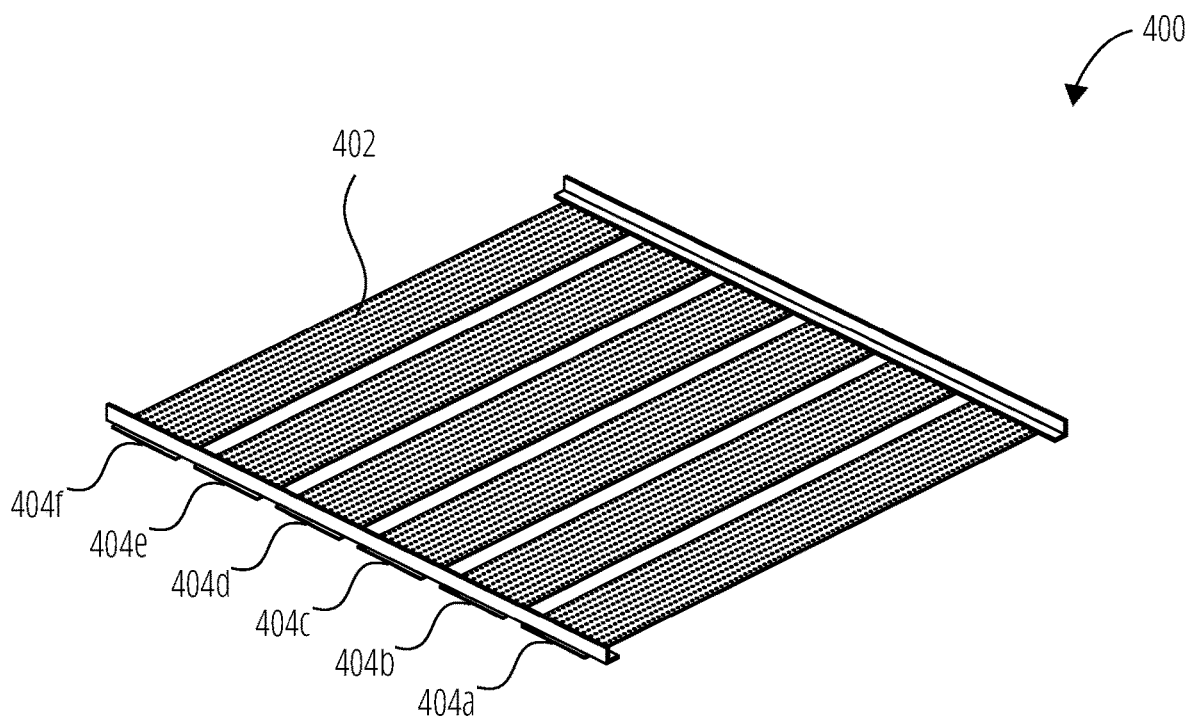
FIG. 4A illustrates a top view of a light tray 400 in accordance with one embodiment.
Figure 4B:
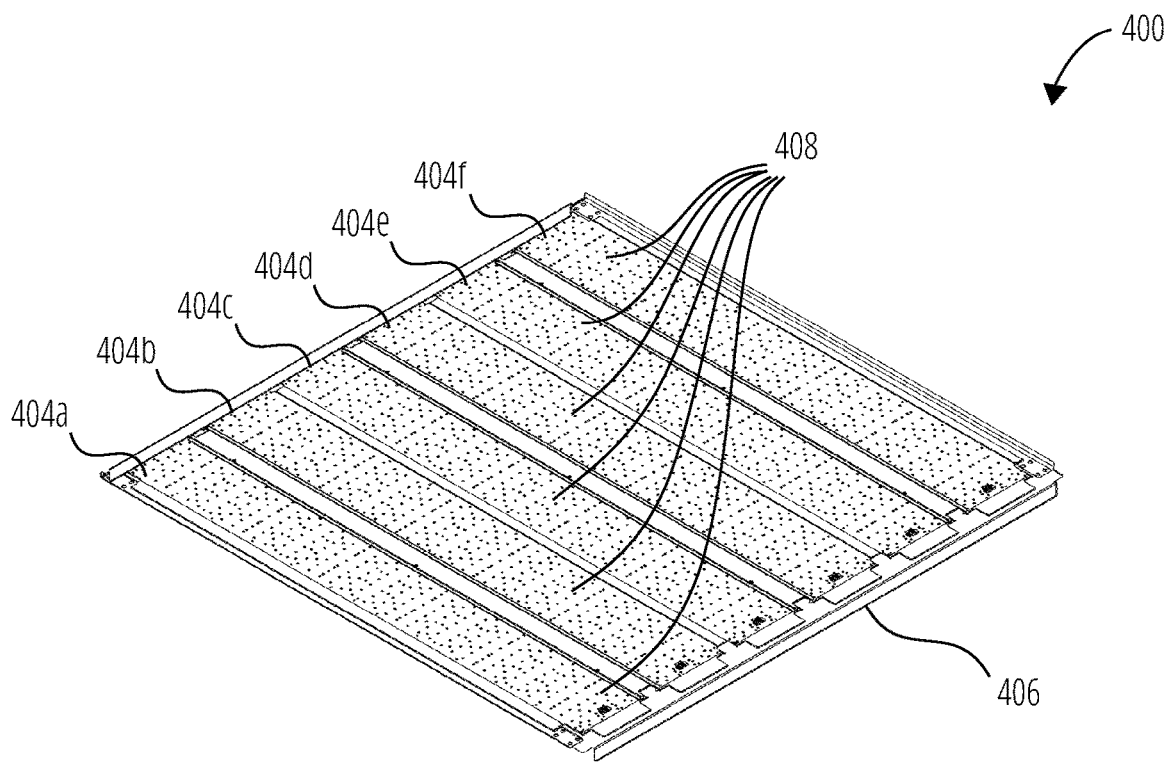
FIG. 4B illustrates a bottom view of a light tray 400 in accordance with one embodiment.

FIG. 4A and FIG. 4B illustrate a light tray 400 in accordance with one embodiment. The top side 402 of the light tray 400 is shown in FIG. 4A. The light tray 400 includes lighting arrays 404a-404f.

Light Tray

"Light tray" in this disclosure refers to a tray that is secured to a grow rack and is typically not removed. The light tray may include at least one lighting array with a connector to connect to power and control signals. In one embodiment, a fixed tray may be used to provide lighting, the fixed tray comprising a lighting array, at least one fan, at least one sensor, and at least one power supply. The light tray 400 may comprises a rectangular shelf, adjustably attached to a grow rack with attachments such as nuts and bolts. The light tray 400 may be made of non-reactive material (e.g., metal or reinforced plastic) of sufficient strength and thickness (e.g., ¼-½ inch) to hold affixed lighting arrays. Each lighting array may connect to a power supply and control system in order to selectively actuate LED patterns connected to different lighting channels. Selective actuating of the lighting channels and LED patterns may facilitate a flexible lighting strategy employed throughout different stages of plant growth, such that growing plants receive optimal lighting while minimizing power wasted on light that is not incident to plant surfaces. To accommodate the attachment of components and allow air and other elements to circulate between multiple light trays and growing trays within the grow module, the light tray 400 may include internal cross-supports or be in a mesh-like or cross-hatch pattern.

Machine-Readable Identification

The light tray in one embodiment may include a machine-readable identification directly attached to it for the purpose of informing the control system to determine the specific nutritional and elemental needs of the plants, seeds or seedlings, and/or shoots of plants in the growing tray beneath the light tray. In one embodiment the machine-readable identification comprises an RFID device or a NFC device. In another embodiment the machine-readable identification comprises a printed graphic symbol or group of symbols, e.g., QR code or bar code, also known as readable by a scanning red LED, laser light, or similar scanning device. In one embodiment the machine-readable identification may be a sticker affixed to the light tray in a location (e.g., on the side) easily accessible by a reader of said machine-readable identification. "Machine-readable identification" in this disclosure refers to a graphic or visible identifier able to be interpreted without human interaction. Exemplary machine-readable identification includes RFID or NFC devices, barcodes and quick response codes.

FIG. 4B illustrates the underside 406 of the light tray 400. These lighting arrays may be printed circuit boards including LED patterns 408 on the underside 406 associated with lighting channels, such that the LED patterns 408 of each light tray 400 may project light downward onto the growing tray positioned below the light tray 400. The LED patterns 408 may be selectively turned on and off according to a lighting strategy designed for the plants to be illuminated by the light tray 400.

Figure 5A:
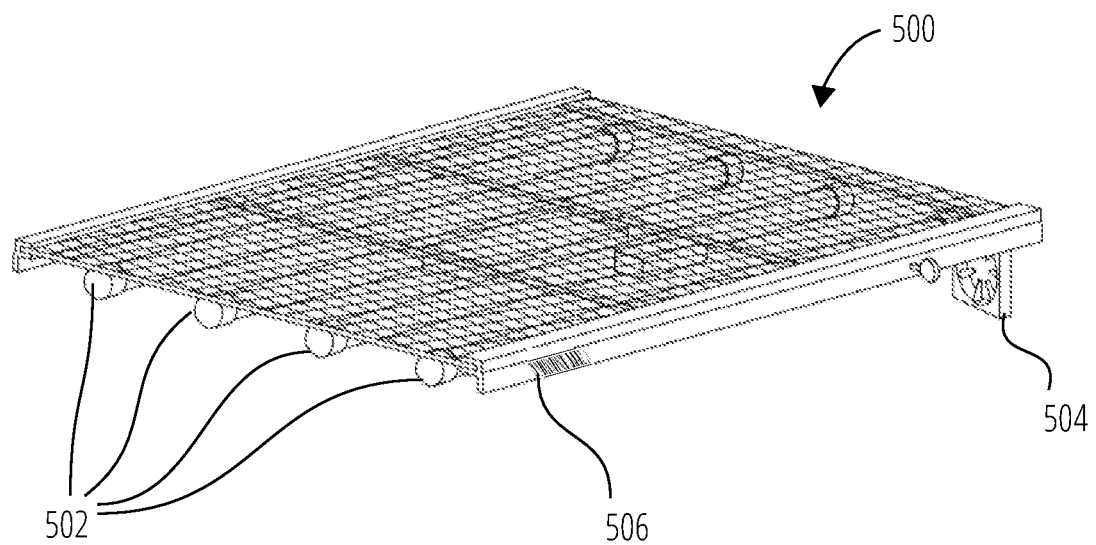
FIG. 5A illustrates a top view of a fixed tray 500 in accordance with one embodiment.

Referring to FIG. 5A, a fixed tray 500 is illustrated. The fixed tray 500, as previously described, is a non-removable shelf within the grow rack included as a plurality of tray modules within a grow module. The tray module comprises both the fixed tray 500 and an accompanying growing tray holding a plurality of plant vessels comprising plants, seeds or seedlings, and/or shoots of plants receiving external elements from said fixed tray 500. The fixed tray 500 as shown, comprises a lighting array 502 calibrated to provide an appropriate level of light to the plants, seeds or seedlings, and/or shoots of plants growing in the plurality of plant vessels in a growing tray beneath each fixed tray 500.

Similarly, the fixed tray 500 also includes in one embodiment at least one fan 504 providing air or other gases as needed to circulate around the plants, seeds or seedlings, and/or shoots of plants growing in the plurality of plant vessels.

In an embodiment, to assist in the determination of the nutrient and elemental needs of the plants, seeds or seedlings, and/or shoots of plants in a growing tray, a machine-readable identification 506 may be affixed to each fixed tray 500. The graphic pattern of the machine-readable identification 506 may comprise information regarding specific nutritional and elemental needs of the plants, seeds or seedlings, and/or shoots of plants in a growing tray beneath the fixed tray 500 with said affixed machine-readable identification 506. When read by devices such as a scanning red LED, laser light, or similar scanning device, the machine-readable identification 506 may be processed by the control system to subsequently determine the specific nutritional and elemental needs of the plants, seeds or seedlings, and/or shoots of plants in the growing tray beneath the fixed tray 500.

Fixed Tray

The fixed tray 500 comprises a rectangular shelf, attached to a grow rack with attachments such as a nut/bolt, weld, and/or adhesives. The fixed tray 500 may be made of non-reactive material (e.g., metal or reinforced plastic) of sufficient strength and thickness (e.g., ¼-½ inch) to hold several affixed components, including but not limited to at least one fan, at least one sensor, lighting array, and at least one power supply with a sufficient number of conduits to attach at least one power supply to the other components. In one embodiment at least one power supply may be a self-contained battery. In another embodiment, at least one power supply may be connected to a power source external to the grow module in which the fixed tray 500 resides. To accommodate the attachment of components and allow air and other elements to circulate between multiple fixed trays and growing trays within the grow module, the fixed tray 500 may include internal cross-supports or be in a mesh-like or cross-hatch pattern.

Machine-Readable Identification

The fixed tray 500 may include a machine-readable identification 506 directly attached to it for the purpose of informing the control system to determine the specific nutritional and elemental needs of the plants, seeds or seedlings, and/or shoots of plants in the growing tray beneath the fixed tray 500. A growing tray may also have a machine-readable identification 506 attached thereto, containing different or similar information to the machine-readable identification 506 attached to the fixed tray 500 immediately above said growing tray. In one embodiment the machine-readable identification 506 comprises a radio-frequency identification (RFID) device or a Near Field Communication (NFC) device. In another embodiment the machine-readable identification 506 comprises a printed graphic symbol or group of symbols, e.g., quick response (QR) code or bar code, also known as readable by a scanning red LED, laser light, or similar scanning device. In one embodiment the machine-readable identification 506 may be a sticker affixed to the fixed tray 500 in a location (e.g., on the side) easily accessible by a reader of said machine-readable identification 506.

Figure 5B:
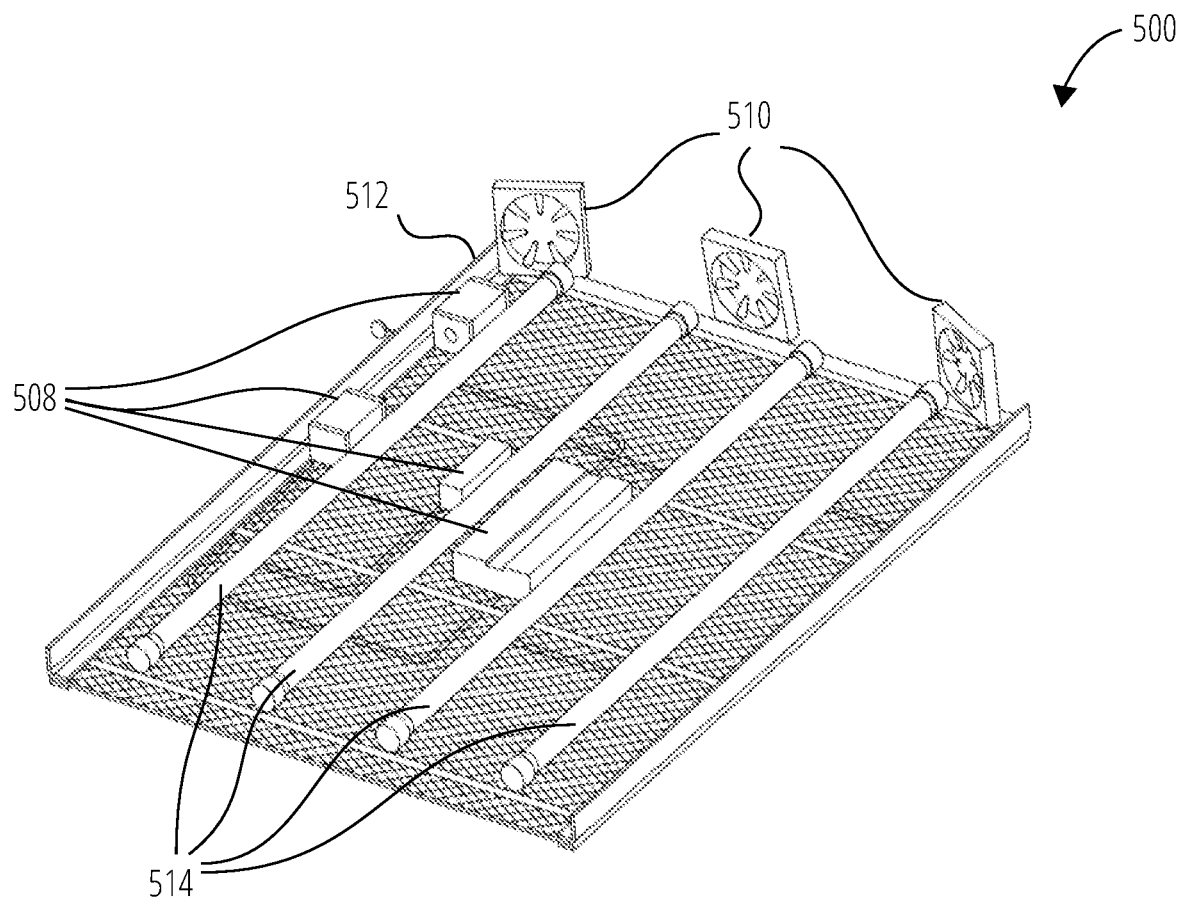
FIG. 5B illustrates a bottom view of a fixed tray 500 in accordance with one embodiment.

Referring to FIG. 5B, a fixed tray 500 is described. As with FIG. 5A, the light tray 512 comprises a non-removable shelf within the grow rack included as a plurality of tray modules within the grow module, as the tray module comprises both the light tray 512 and an accompanying growing tray holding a plurality of plant vessels comprising plants, seeds or seedlings, and/or shoots of plants receiving external elements from said light tray 512. Components affixed to the light tray 512 for the purpose of facilitating the growth of plants, seeds or seedlings, and/or shoots of plants in the accompanying growing tray include lighting array 514, at least one fan 510, at least one sensor, and at least one power supply 508 to provide electrical power to the previously named components through accompanying wiring in attendant conduits. The components—lighting array 514, at least one fan 510, at least one sensor, and at least one power supply 508—may be affixed to the bottom of the light tray 512 both for reason of utility, e.g., lighting array 514, at least one fan 510, and at least one sensor need be in aerial contact with the plants, seeds or seedlings, and/or shoots of plants directly beneath the light tray 512, and spatial efficiency, e.g., placing these components with at least one power supply 508 above the light tray 512 may interfere with the growing tray in the tray module above said light tray 512.

Lighting Array

"Lighting array" in this disclosure refers to illumination to facilitate plant growth, including but not limited to LEDs or other lighting encompassing a sufficiently wide range of wavelengths to emulate sunlight. The lighting array 514 affixed to the light tray 512 within the grow rack may be calibrated to facilitate plant growth for the specific plants, seeds or seedlings, and/or shoots of plants directly beneath the light tray 512. Said calibration may include the range of light spectrum, strength (e.g., lumens per area) and light type (e.g., LED or incandescent). An exemplary lighting array 514 solution may be LED lighting with a balance of blue (cool) and red (warm) light wavelengths that replicates the natural solar spectrum at 400-800 lumens per square foot.

Figure 6:
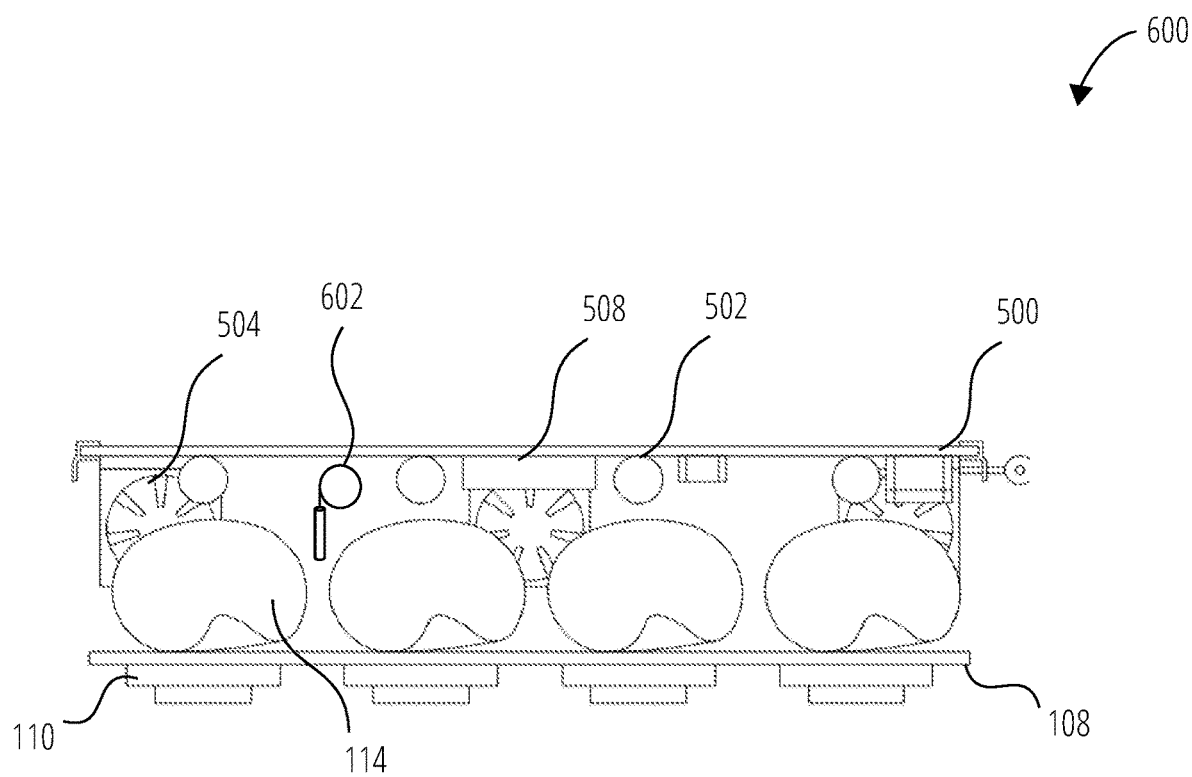
FIG. 6 illustrates a fixed tray with growing tray 600 in accordance with one embodiment.

Referring to FIG. 6, a fixed tray with growing tray 600 is illustrated showing previously described components of the tray module from a side view. As noted, the tray module may comprise a fixed tray 500, with affixed lighting array 502, at least one sensor 602, at least one fan 504, and at least one power supply 508, located within a grow rack or grow module and positioned above a growing tray 108 comprising a plurality of plant vessels 110 containing plants 114, seeds or seedlings, and/or shoots of plants. Each plant vessel 110 may be positioned optimally beneath the lighting array 502, next to or far from at least one fan 504 and within range of at least one sensor 602 measuring light or other conditions, i.e., from the lighting array 502, temperature, and/or humidity. The location of at least one sensor 602 may vary according to the growth stage(s) of the plants 114 affected by the light, temperature, and/or humidity measured and monitored by the sensor(s). As an example, more sensors may be used for plants in plant vessels at a germination stage than at a finishing stage.

At Least One Sensor

"Sensor" in this disclosure refers to one or more sensing devices able to detect precise measurements of light, temperature, humidity, and/or other conditions of its surrounding environment. In an embodiment, at least one sensor 602 may be a light sensor, temperature sensor, humidity sensor or some combination of the three depending on the needs of plants in a grow module at a particular time. The type of sensor is not limited thereto. All types sensors for detecting said conditions in a plant growing environment as described herein may be used. At least one sensor 602 measuring light may be a commercially available light sensor drawing ~24V and measuring both lumen strength and light wavelengths to ensure proper lighting for the plants 114, seeds or seedlings, and/or shoots of plants lit by the lighting array 502. In one embodiment, at least one sensor measuring light may be located on the grow rack within the grow module. At least one sensor 602 measuring temperature may be located in multiple locations within the grow module and comprise a Type K thermocouple with a lead wire transition probe, 6-inch insertion length, ⅛ inch probe diameter, stainless steel sheath, and 6 foot 20 American wire gauge (AWG) wire leads. At least one sensor 602 measuring humidity may be located in multiple locations within the grow module, draw ~5V and include the ability to measure the full range (1-99%) of air humidity via use of a psychrometer, e.g., comparing the readings of a pair of thermometers, one with a bulb open to the air; the other has a bulb covered in a wet cloth or similar substance. In one embodiment at least one sensor 602 measuring both temperature and humidity may be co-located in a single device.

At Least One Fan

In an embodiment, at least one fan 504 may be affixed to the fixed tray with growing tray 600 for the purposes of circulating air or other gases amongst the plants, seeds or seedlings, and/or shoots of plants in plant vessels 110 in tray modules within the grow module. Air movement allows plants to dispense water vapor for optimum growth and production. Moving the air to create a gaseous current may encourage this evaporation process, regardless of temperature and humidity. In one embodiment at least one fan 504 may be calibrated to accomplish this task for plants of varying sizes and growth rates. At least one fan 504 may be made of a non-reactive material (e.g., plastic or metal) and of a design providing air current(s) within a confined space, e.g., multi-bladed, powered by a 2-8 watt engine and encased in an cage enclosure for safety. In one embodiment at least one fan 504 may be embedded in the back wall of the grow module, e.g., detached from a light tray.

At Least One Power Supply

In an embodiment, at least one power supply 508 may be affixed to the fixed tray with growing tray 600 for the purpose of providing electrical power to attendant components also affixed to the fixed tray with growing tray 600, i.e., lighting array 502, at least one fan 504, and at least one sensor 602. At least one power supply 508 and its attendant wiring through encased conduits may be powered by external electrical sources or internal power (e.g., nickel/cadmium or similar batteries). Depending on the electrical needs of the various powered components, not least the number of supported fixed trays or light trays, a ~100V alternating current (AC) or ~15V direct current (DC) power supply may be adequate.

Figure 7:
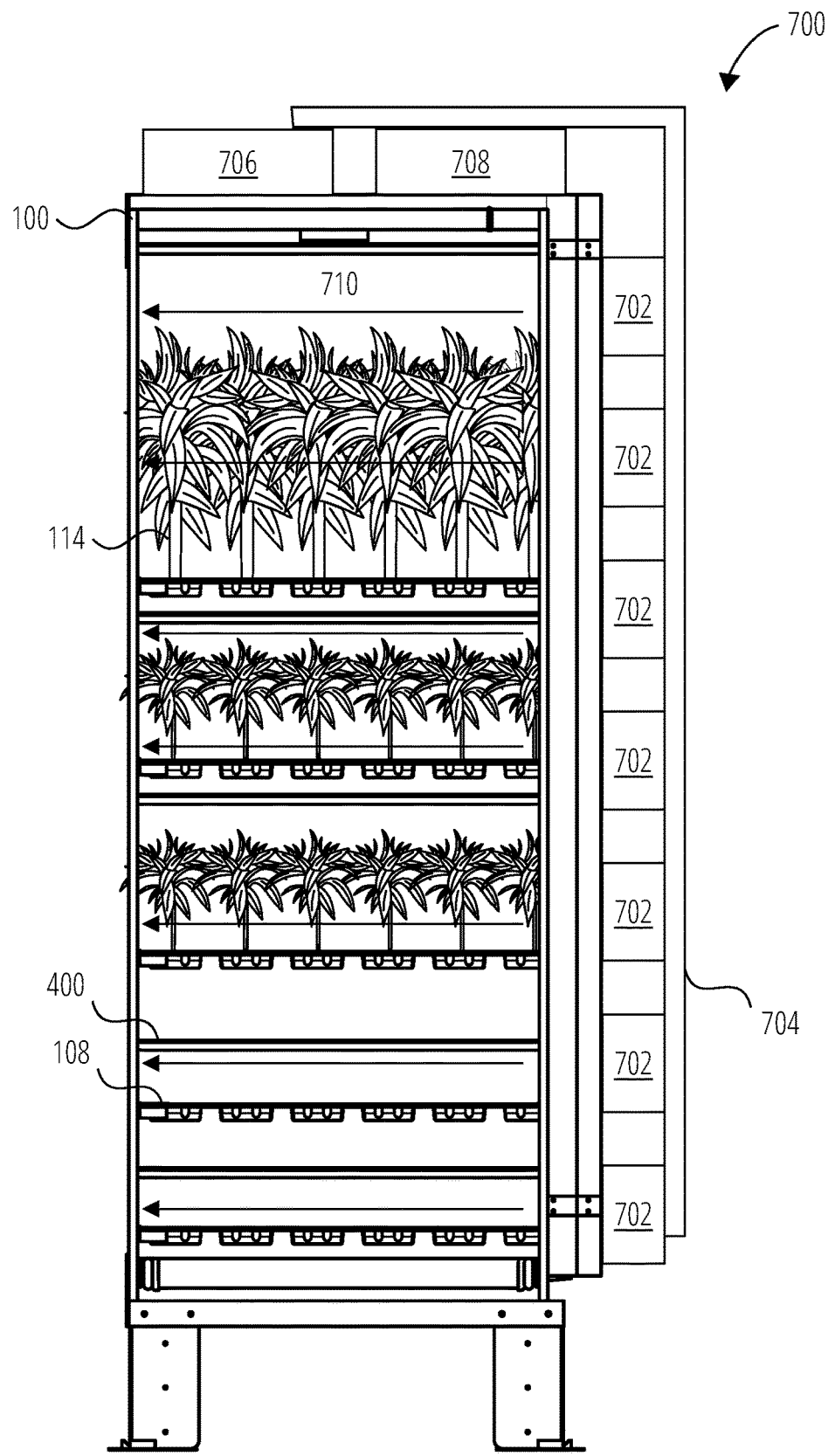
FIG. 7 illustrates a ventilation system 700 in accordance with one embodiment.

FIG. 7 illustrates a ventilation system 700 in accordance with one embodiment. The ventilation system 700 for a grow module 100 may be configured with at least one fan 702 on the back of the grow module 100. "Fan" in this disclosure refers to one or more devices capable of moving air currents at a fixed or variable rate. The fans 702 configured on the back of the grow module 100 may connect via fan wiring 704 to a control system 706 and power supply 708 configured for the individual grow module 100. The fan 702 and power supply 708 may be configured similar those described previously with respect to FIG. 6, or otherwise as appropriate to the number of fans and the desired air flow 710 for each grow module 100 or each growing tray 108. The air flow 710 may be measured by the at least one sensor 602 described previously, and may be controlled by the control system 706.

Figure 8A:
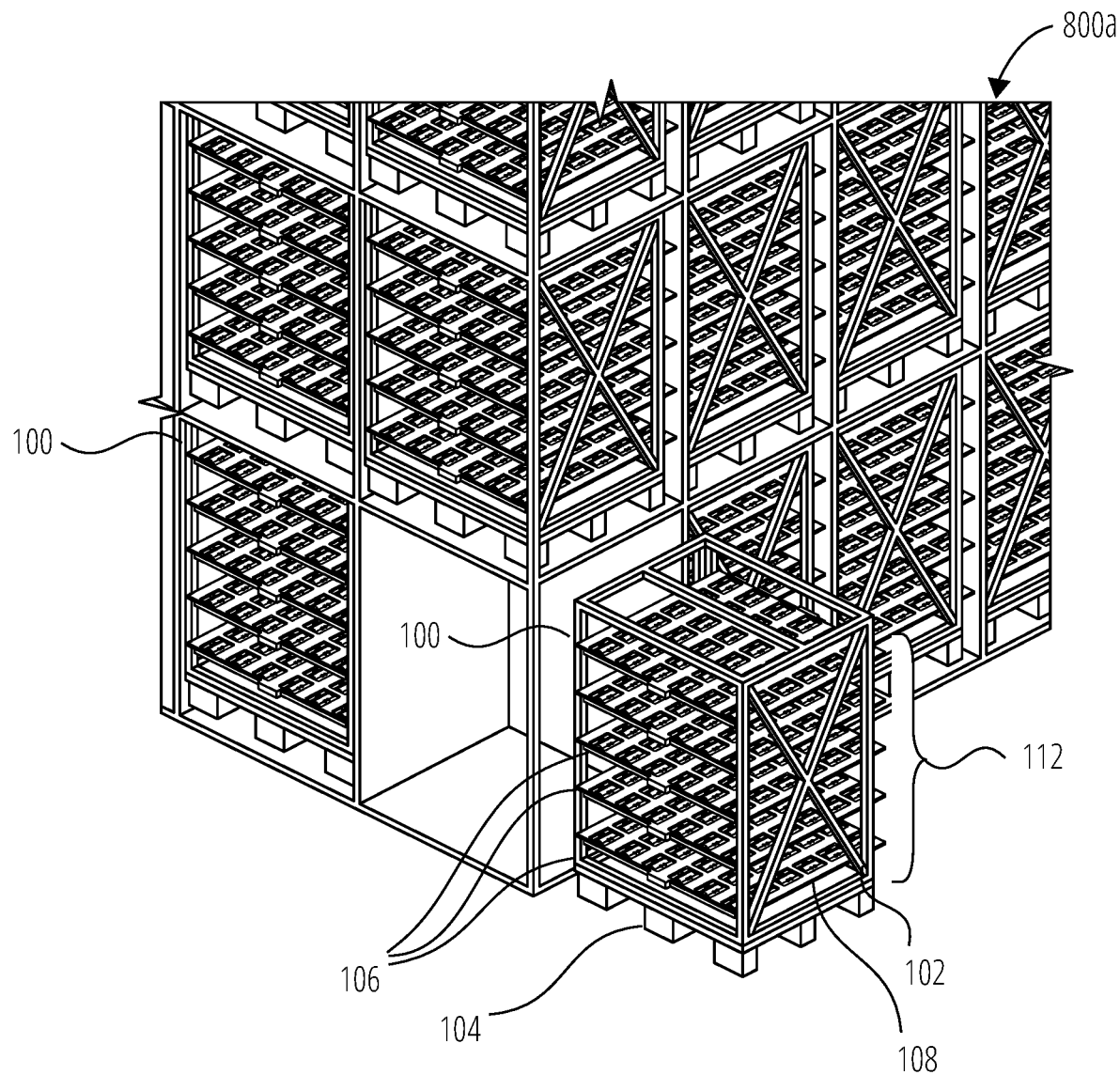
FIG. 8A illustrates a growing configuration with stacked grow racks 800a in accordance with one embodiment.

Referring to FIG. 8A, growing configuration with stacked grow racks 800a are shown. In one embodiment, each grow module 100 may contain a grow rack 102 holding tray module 106 in a vertically stacked configuration 112, including a plurality of plant vessels that are housed and fertigated at periodic intervals by a fertigation system. Plant vessels of specific arrangements may be included in a growing tray or a collection of said growing trays depending on the number of plants, seeds or seedlings, and/or shoots of plants with similar fertigation needs, as previously described. "Grow rack" in this disclosure refers to a physical shelf, containing a plurality of plants in growing vessels. The grow rack may include means of illumination and temperature control to serve the controlled cultivation of plants.

As shown, each grow module 100 may be removed from the collection of grow modules 100 in the growing configuration with stacked grow racks 800a for purposes of fertigating the individual plants in the grow module 100, transporting the plants in the grow module 100, or other logistical purposes. Grow modules 100 may be stacked vertically as well as arranged in horizontal arrays. In one embodiment, the number of grow modules 100 contained in such an arrangement is dependent on the strength of the growing configuration with stacked grow racks 800a and the respective weight(s) of the grow modules, particularly those at or near the top of said configuration. The process by which each grow module 100 is removed, added, and/or re-arranged within a vertical configuration may include, but are not limited to, devices such as forklifts or shelving and ramps by which each grow module 100 may be effectively re-located for the purpose(s) named above.

Figure 8B:
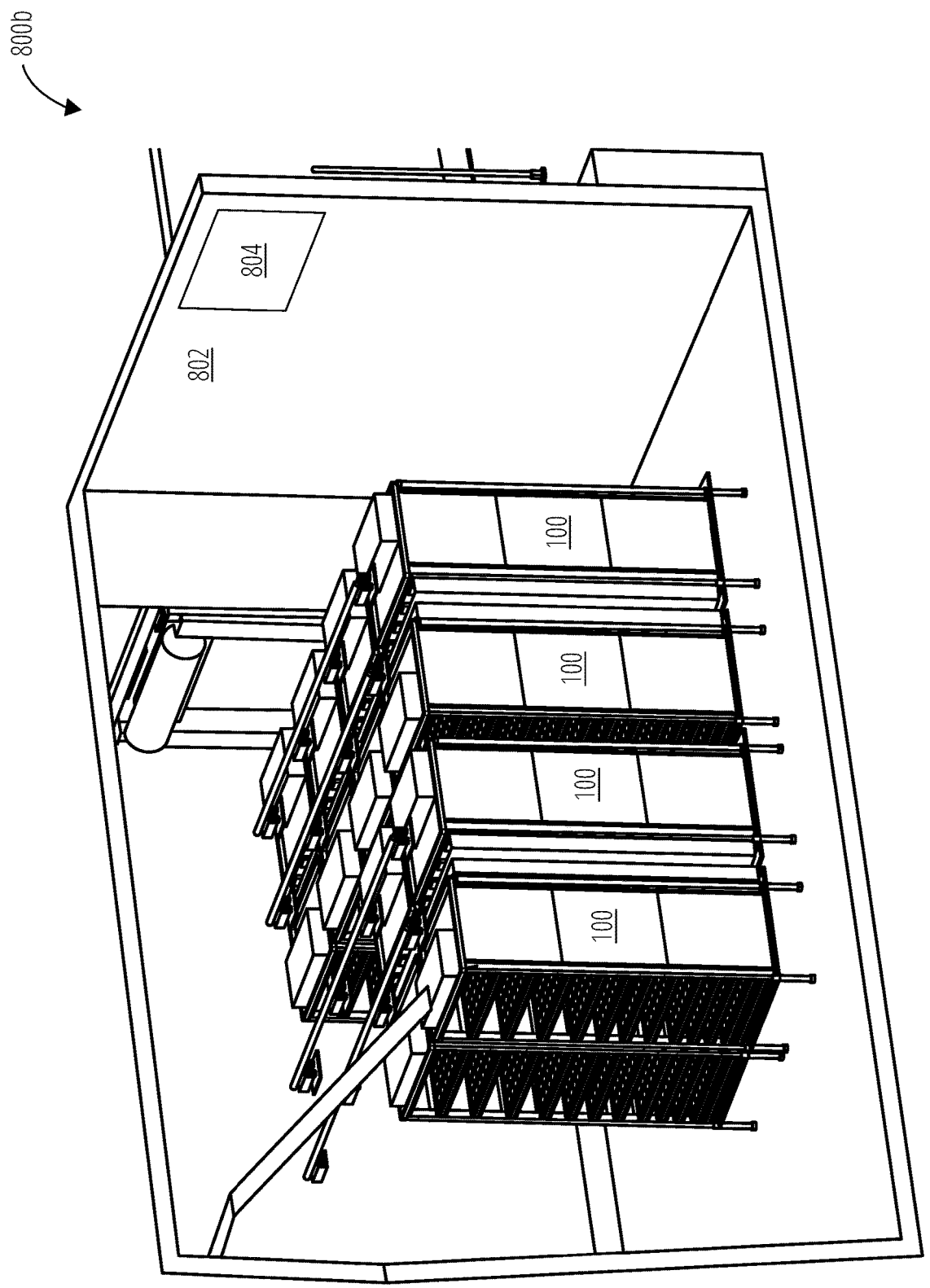
FIG. 8B illustrates a growing configuration with grow modules in a growing chamber 800b in accordance with one embodiment.

FIG. 8B illustrates a growing configuration with grow modules in a growing chamber 800b in accordance with one embodiment. The growing configuration with grow modules in a growing chamber 800b comprises a growing chamber 802 containing one or more grow modules 100.

The grow chamber as used in this description may be an enclosed area including an environmental regulation system capable of adjusting the temperature, humidity, and carbon dioxide levels. It may be managed through the control system described with respect to FIG. 18 below. The enclosed area may be the entire facility or a portion of the facility. In one embodiment, cooler wall panels with specific insulating properties may be used to isolate a portion of the facility, a heating, ventilation, and air conditioning system (HVAC) system may be used to regulate the temperature and humidity and inject $CO_2$ from storage tanks internal to the HVAC, and controllable roll-up Albany style doors may be used as an interface to the chamber to allow automated guided vehicles (AGVs) to enter and leave with grow modules 100.

The growing chamber 802 may incorporate ventilation and climate control 804 providing airflow and controlling humidity and temperature for the growing chamber 802. In one embodiment, the ventilation and climate control 804 may be facility-wide. In one embodiment, each grow module 100 may instead or in addition incorporate a ventilation system 700 as illustrated in FIG. 7.

A facility may have one or more growing chambers 802. Grow modules 100 may be moved from growing chambers 802 to fertigation stations using AGVs. Grow modules 100 may incorporate mounting hardware or other structural components that secure them in an array within a growing chamber 802, fix them to AGVs for transport, and at designated spots within the facility near the fertigation station that tray movement systems may remove trays and plants from the grow modules 100 for fertigation.

Figure 9:
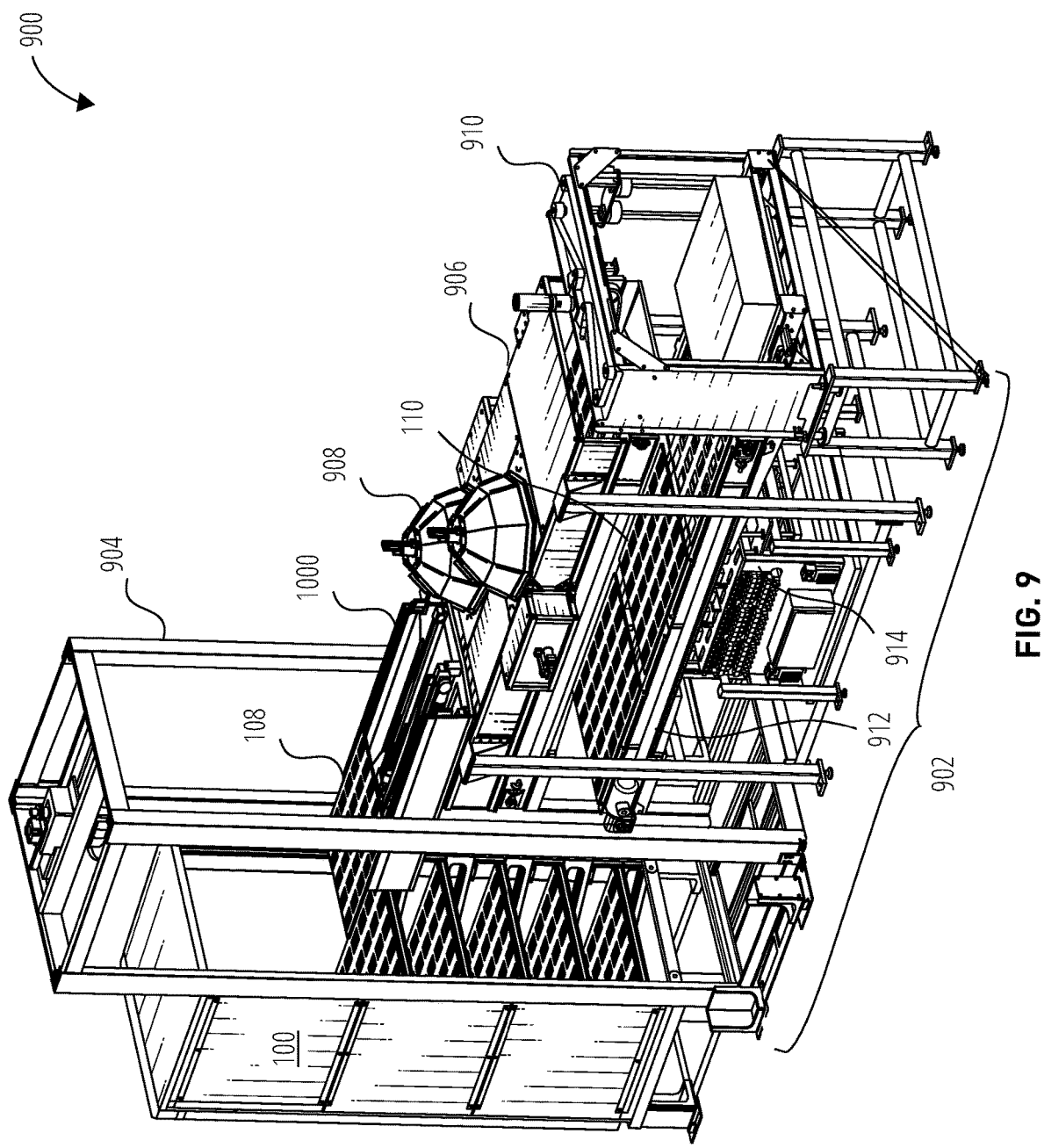
FIG. 9 illustrates a grow module and fertigation station 900 in accordance with one embodiment.

Referring to FIG. 9, a grow module and fertigation station 900 is illustrated. In one embodiment, a grow module 100 may contain a plurality of growing trays, each tray holding a plurality of plant vessels containing seeds, seedlings, shoots of plants, and/or plants in various stages of development. The grow module 100 may contain a variable number of growing trays, configured according to the fertigation needs of the individual plants, seeds or seedlings, and/or shoots of plants, each plant vessel 110 contained within the growing tray 108.

As shown, a growing tray 108 may be extracted from the grow module 100 via a tray movement system 1000, an automated or manual system for sliding a growing tray 108 from the grow module 100 for fertigation purposes. The tray movement system 1000 may then position the growing tray 108 onto an upper conveyor 906. The upper conveyor 906 may carry the growing tray 108 to an imaging station 908, as is described in greater detail with respect to FIG. 12. The upper conveyor 906 may further transport the growing tray 108 to a tray elevator 910, which may lower the tray to the level of a lower conveyor 912.

The lower conveyor 912 may position the growing tray 108 above the nozzle manifold 914 of the fertigation station 902. The nozzle manifold 914 may be configured such that the at least one nozzle is aligned with plant vessels 110 contained within the growing tray 108. The number and type of the at least one nozzle may be configured to correspond with the plant vessel configuration in each growing tray 108, as well as with the mixture of fresh water supply and nutrient supply pumped by the first pump to the nozzle manifold 914. This may be customized based on the specific fertigation needs of the individual seeds, seedlings, shoots of plants, and/or plants contained therein.

Tray Elevator

The tray elevator 910 comprises a drive system powered by a motor for the purpose of raising and lowering growing trays, one at a time, growing trays between an upper conveyor 906 and a lower conveyor 912. Said drive system may be of any type such as, but not limited to, a belt drive, a chain drive, a direct drive, etc. The motor, under control of the control system, may power the drive mechanism to pull the growing tray 108 to its proper vertical position.

Tray Movement System

Figure 10A:
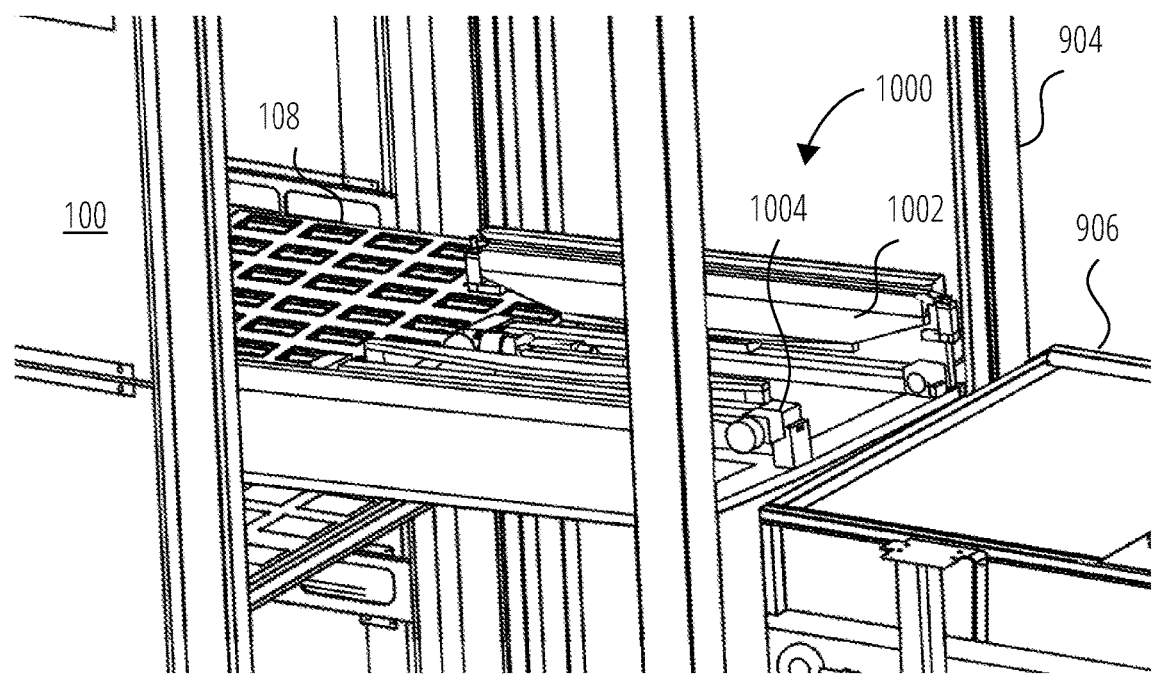
FIG. 10A illustrates a tray movement system 1000 in accordance with one embodiment.
Figure 10B:
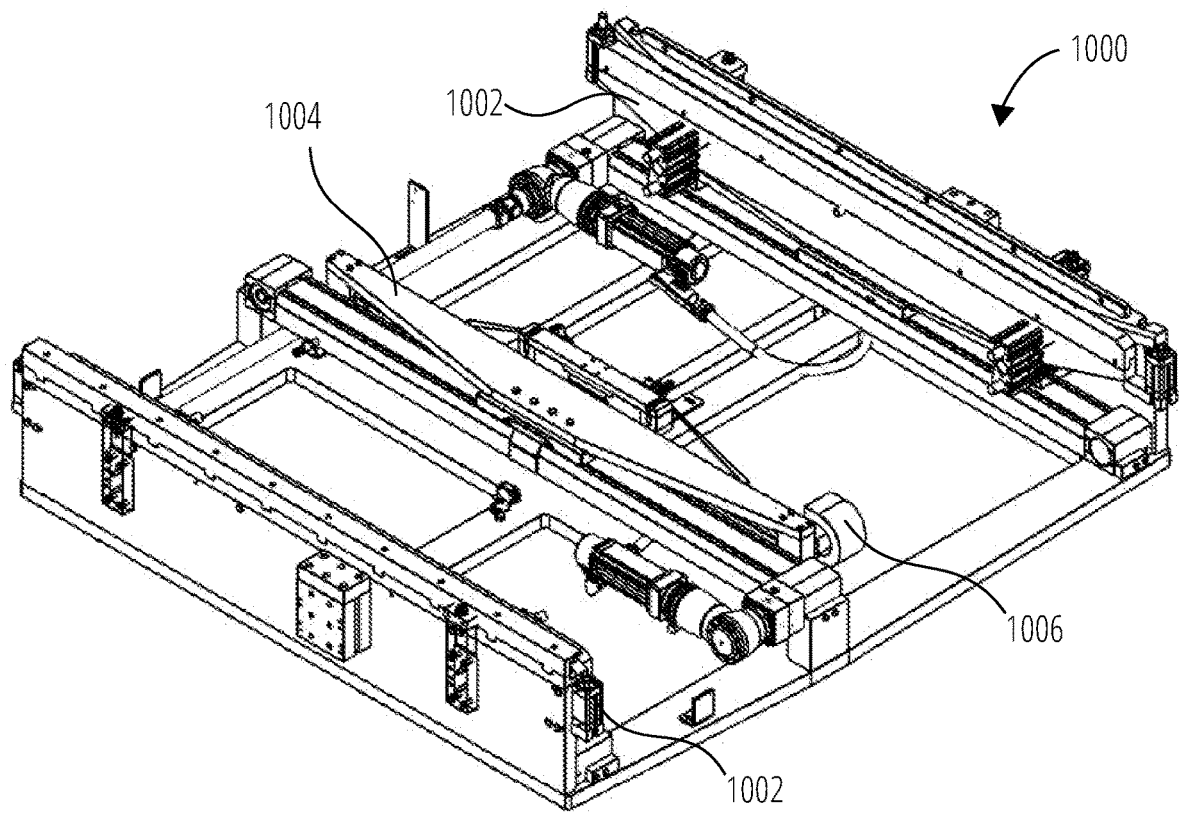
FIG. 10B illustrates a tray movement system 1000 in greater detail in accordance with one embodiment.

FIG. 10A and FIG. 10B illustrate a tray movement system 1000 in one embodiment.

"Tray movement system" in this disclosure refers to a variety of components, including but not limited to a motor, a mechanical arm under control of said motor, tracks on which a growing tray slides, and a tray elevator, all utilized for the purpose(s) of extracting a growing tray from a grow module and replacing the growing tray in the same position within the grow module when the fertigation process has been completed. "Track" in this disclosure refers to a structure on the fertigation system upon which a growing tray may rest and/or slide. "Tray elevator" in this disclosure refers to a drive system powered by a motor for the purpose of raising and lowering individually growing trays from a grow module. In one embodiment, the tray elevator may transition growing trays from an upper conveyor to a lower conveyor. In one embodiment, the tray elevator may position a growing tray onto at least one nozzle for each nozzle manifold for fertigation.

The tray movement system 1000 comprises various components for the purpose(s) of both extracting a growing tray 108 from the grow module 100 and replacing the growing tray 108 in the same position, or alternatively in a different position, within the grow module 100 when the fertigation process has been completed for all the plant vessels in the growing tray 108. The tray movement system 1000 comprises components known to those skilled in the art for moving a tray holding fragile objects in a horizontal direction under machine-driven or manual power: at least one track 1002 on which the growing tray 108 slides on once removed from the grow module 100, an arm 1004 extending from the apparatus to temporarily latch onto the growing tray 108, pull it onto the apparatus and release it at the appropriate position, a configuration to raise or lower the growing tray 108 along with the tray movement system 1000 into a desired vertical position along the fertigation gantry 904 (not shown), a motor (under electrical or equivalent power) to spin a belt or similar drive to extend/contract the arm 1004 and power the raising and lowering configuration, all configured to also to perform this operation in reverse to return the growing tray 108 to its position within the grow module 100. In an embodiment, the arm may include a tray attachment feature 1006 such as a magnetic connection, a latch, or end of arm tooling, to attach to the growing tray 108.

In an embodiment the growing tray 108 may also be lifted slightly (e.g., less than one inch) off the shelving in the grow module 100 by the arm 1004 of the tray movement system 1000 before being extracted. In this embodiment, slide tracks within the grow module 100 may not be needed. Short legs may be extended under the growing tray 108 (e.g., at the four corners). Said legs may be removable/adjustable for different size pots/plants.

FIG. 10B illustrates in more detail one embodiment of a tray movement system 1000. The tray movement system 1000 comprises tracks 1002, an arm 1004, and a tray attachment feature 1006.

Figure 11:
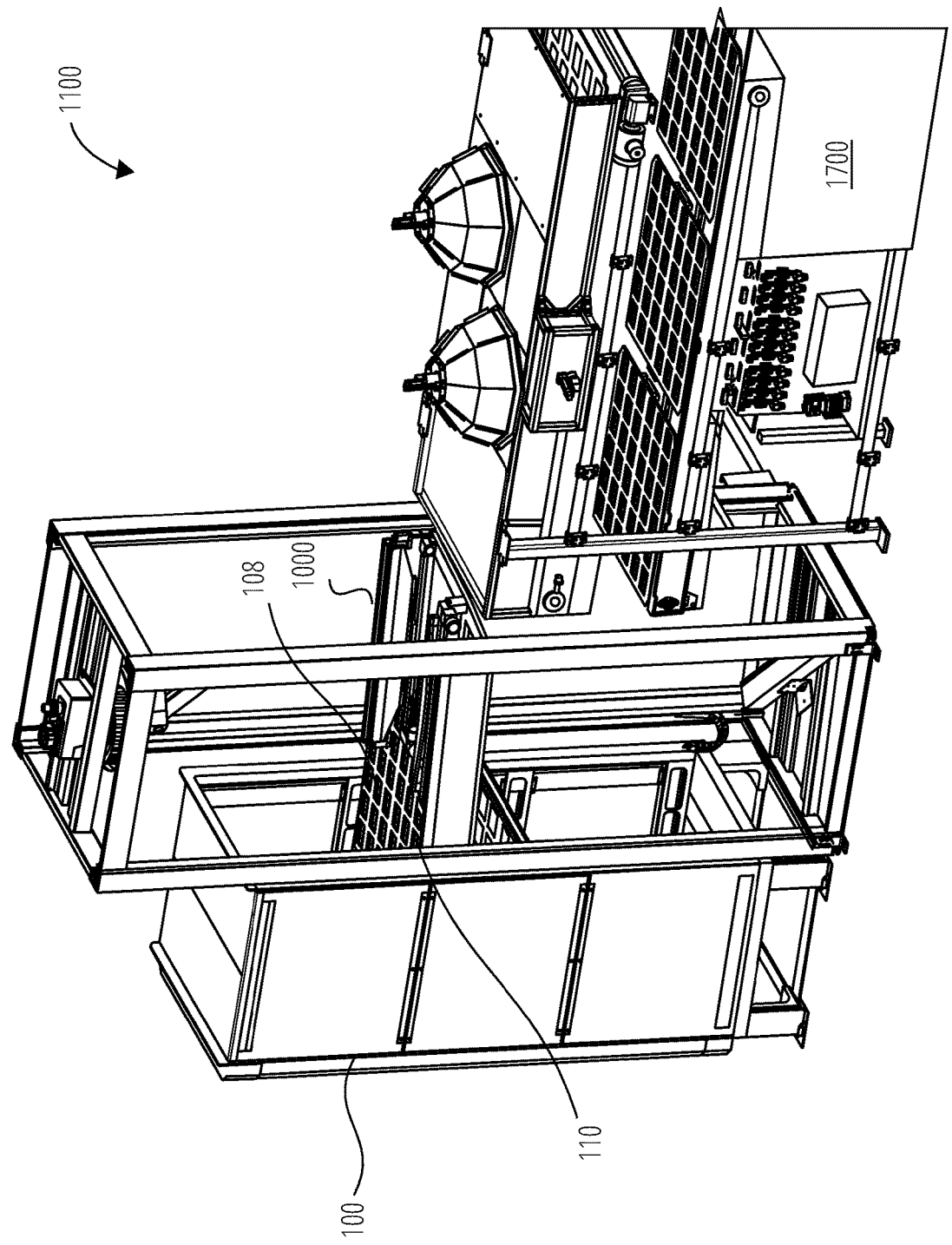
FIG. 11 illustrates a growing tray and tray movement system 1100 in accordance with one embodiment.

Referring to FIG. 11, a growing tray and tray movement system 1100 is illustrated to show how plant vessels 110 in growing trays 108 may be manipulated. A plurality of growing trays 108 may hold a variable number of plant vessels 110, each plant vessel containing plants, seeds or seedlings, and/or shoots of plants. The number and type of plants, seeds or seedlings, and/or shoots of plants in the plant vessels in the grow racks may be configured according to their collective fertigation needs, that is the lighting, air, and liquids needed for effective germination and growth.

Each growing tray 108 containing a plurality of plant vessels 110 may be contained within a grow module 100. As previously described, plants, seeds or seedlings, and/or shoots of plants growing in separate plant vessels may be collected into growing trays 108 according to their collective needs. Said growing trays 108, positioned within a grow module 100, may be extracted from the grow module 100 by a tray movement system 1000.

As shown, the tray movement system 1000 may extract a growing tray 108 with at least two degrees of horizontal freedom from the grow module 100. Once the growing tray 108 containing a plurality of grow racks is removed from the grow module 100, the grow racks may be held in place by the tray movement system 1000 while the nozzle manifold containing an at least one nozzle punctures the plant vessels in the grow racks to deliver the fresh water supply and/or water and nutrient supply from the mixing tank utilizing the first pump in a fertigation system such as the fertigation system 1700 illustrated in FIG. 17.

Figure 12:
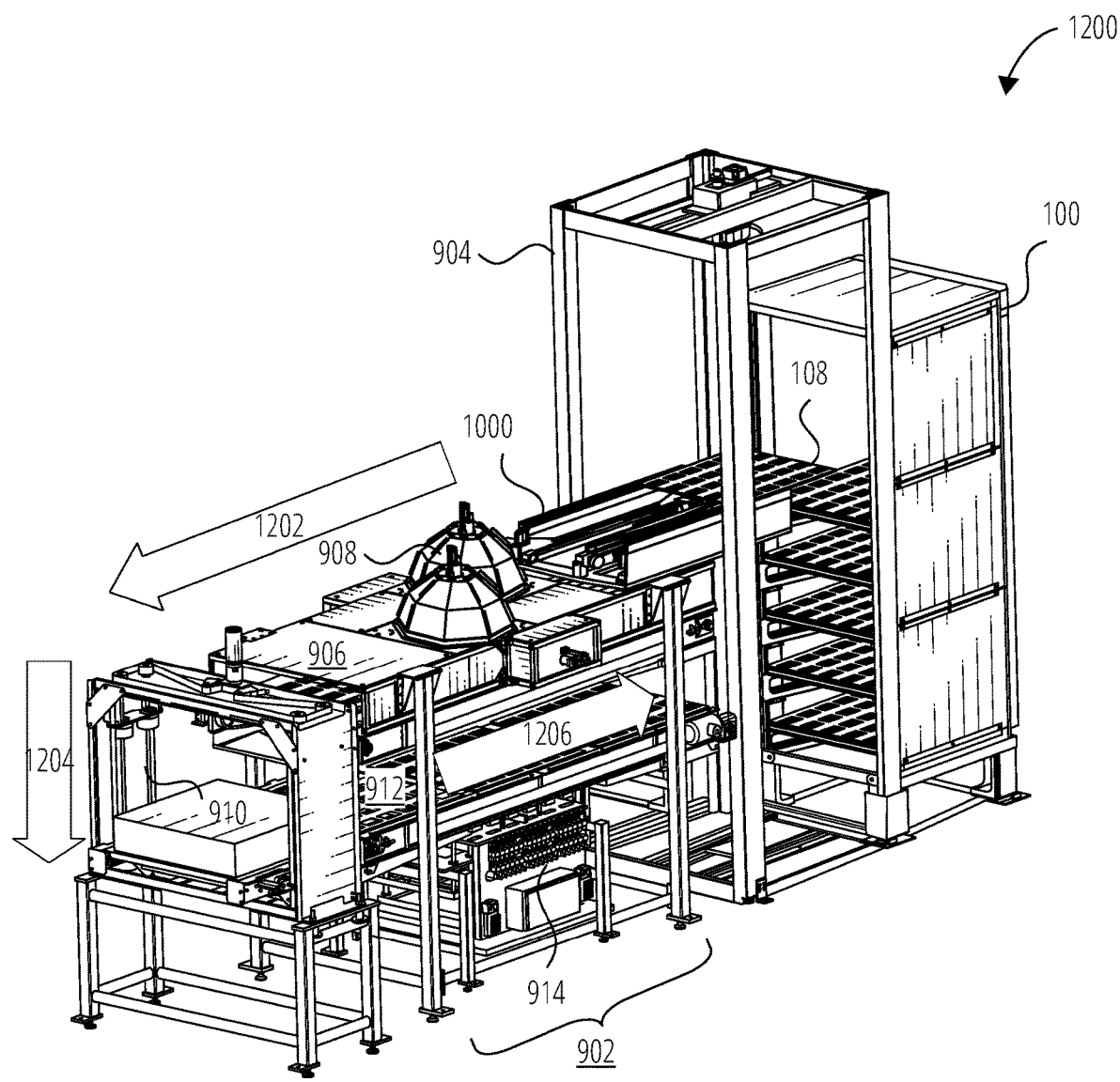
FIG. 12 illustrates a process of growing tray movement for fertigation 1200 in accordance with one embodiment.

Referring to FIG. 12, a process of growing tray movement for fertigation 1200 is illustrated in one embodiment. The process may begin with a growing tray 108 situated in the grow module 100 with a plurality of plant vessels situated within the growing tray 108. As shown, the tray movement system 1000 may extract an individual growing tray 108 from the grow module 100. The tray movement system 1000 may vertically position the growing tray 108 in alignment with the upper conveyor 906. The tray movement system 1000 may then slide the growing tray 108 horizontally onto the upper conveyor 906, which may transport the growing tray 108 to an imaging station 908. After processing at the imaging station 908, the growing tray 108 may be transported by the upper conveyor 906 to the tray elevator 910. This series of actions is represented by arrow 1202.

The tray elevator 910 may lower the growing tray 108 into alignment with the lower conveyor 912, indicated by arrow 1204. The lower conveyor 912 may then, as described previously, carry the growing tray 108 into a precise position in the fertigation station 902 above the nozzle manifold 914, aligning the plant vessels in the growing tray 108 with the at least one nozzle, for the fertigation process. Once the fertigation process (i.e., the lowering of the growing tray 108 onto the nozzle manifold or the raising of the nozzles into contact with the plant vessels, and the plants, and/or shoots of plants in the grow rack being fertigated) is completed, the growing tray 108, nozzle manifold 914, and lower conveyor 912 may be restored to their appropriate vertical positions, and the growing tray 108 may continue down the lower conveyor 912 as indicated by arrow 1206.

The tray movement system 1000 may travel along the fertigation gantry 904 to the correct vertical height to reengage the growing tray 108, now at the level of the lower conveyor 912. The tray movement system 1000 may elevate the growing tray 108 to its original vertical position, or to a vertical position associated with another empty area of the grow module 100 configured to support the 108 in its current configuration. The tray movement system 1000 may then replace the growing tray 108 by sliding it back into its original (or alternate) position in the grow module 100. This process continues for every growing tray 108 in the grow module 100 in need of fertigation.

Figure 13:
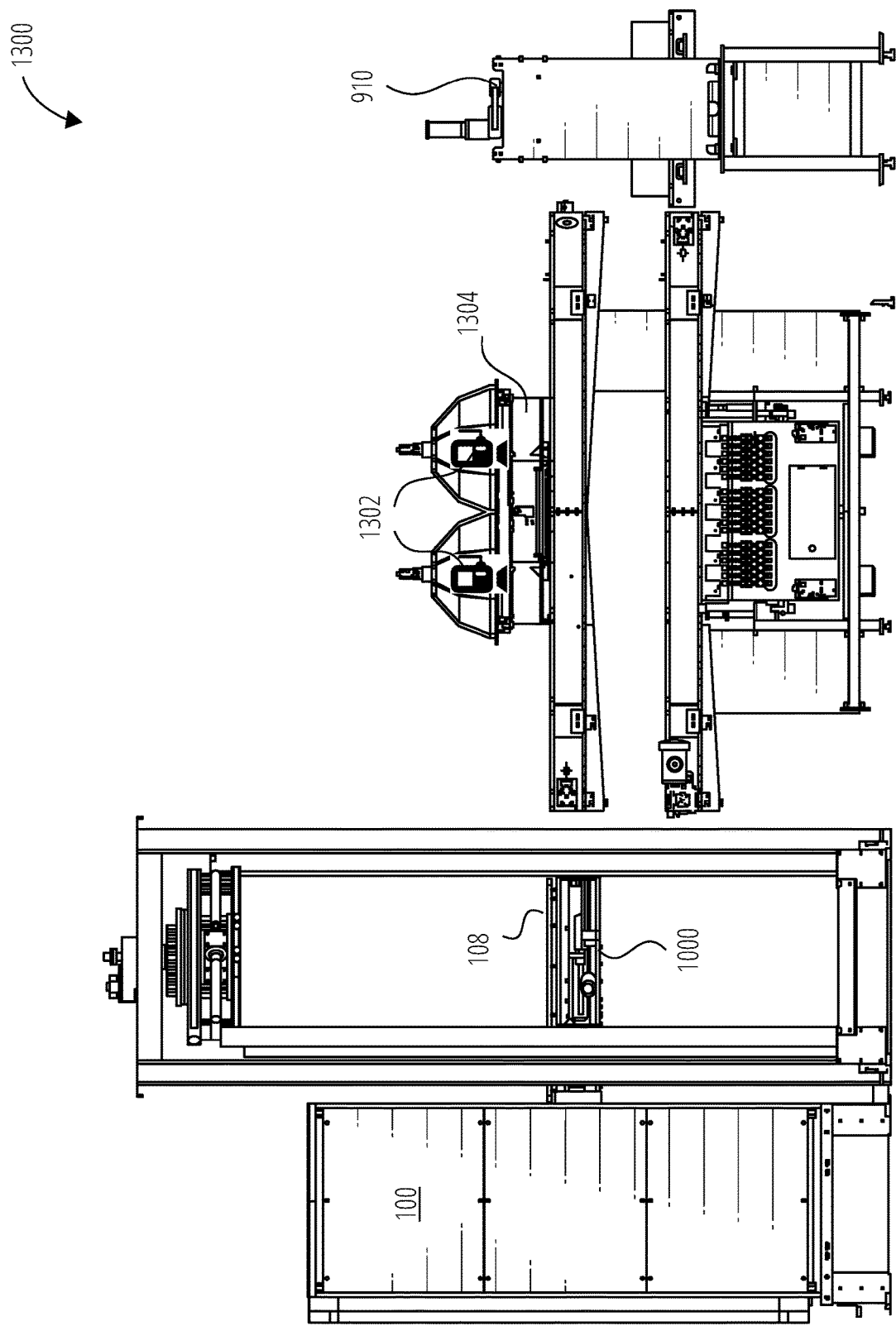
FIG. 13 illustrates an at least one camera in the fertigation system 1300 in accordance with one embodiment.

Referring to FIG. 13, at least one camera in the fertigation system 1300 is described. "Camera" in this disclosure refers to one or more devices used to capture still or video images under automated and/or manual control. Captured images may be digital files or images recorded by light onto film or similar media through a shutter and lens and chemically processed. Plants being fertigated in the fertigation system may be monitored for their growth progress (or lack thereof). Visual inspection and/or collection of photographic evidence may prove difficult when the plants, and/or shoots of plants remain in their respective plant vessels and grow racks inside the grow module 100, particularly when the plants have reached sufficient size, e.g., inspecting and/or photographing sizable plants near the back of the grow module 100 may not be possible. At least one camera 1302, therefore, may be installed at selected locations around the fertigation system to record visual evidence of plant growth on the basis of individual plants or a collection of plants in plant vessels in a grow rack within a growing tray 108, when the latter have been extracted from the grow module 100 by the tray movement system 1000 and aligned above each nozzle manifold.

At least one camera 1302 may be positioned at the top of the fertigation system, secured on an apparatus attached to a vertical support of the fertigation system, e.g., a non-interfering section of the tray elevator 910. Said apparatus may be composed of a solid, non-reactive material of sufficient tension strength to hold the camera in position centered vertically and horizontally above the currently extracted growing tray 108 in the fertigation system and not subject to vibration or other disturbances that may affect camera operation(s). The camera itself may be any device that is capable of capturing, recording, and transferring still and/or video images under control of said camera configuration parameters (e.g., shutter speed, resolution, and so on). Said camera may be configured to record images both at the discretion of an operator of the fertigation system or on an automated schedule, the latter of which may be set on said camera itself by said operator. As the control system 1304 controls the operation of the tray movement system 1000, the tray elevator 910, the first pump and the second pump, the schedule for tray extraction/replacement as determined by the control system 1304 may be synchronized with manual and/or automated control of at least one camera 1302.

In addition to at least one camera 1302 being positioned at the top of the fertigation system as described above, additional cameras may be positioned in other locations on or near the fertigation system to capture alternate views of the plants within the plant vessels in the grow racks having been placed in the fertigation system on the growing tray 108. As shown, said additional cameras may be secured on the first pump or second pump; as these are under control of the control system 1304, camera operation may be configured by a fertigation system operator to not overlap with pump operation(s). The device specifications of said additional cameras may be the same as that described above for at least one camera 1302 at the top of the fertigation system, or different—in terms of image capturing configuration (e.g., shutter speed, resolution, and so on), image capturing schedule, manual or automated control)—as determined by plant growth requirements.

Figure 14:
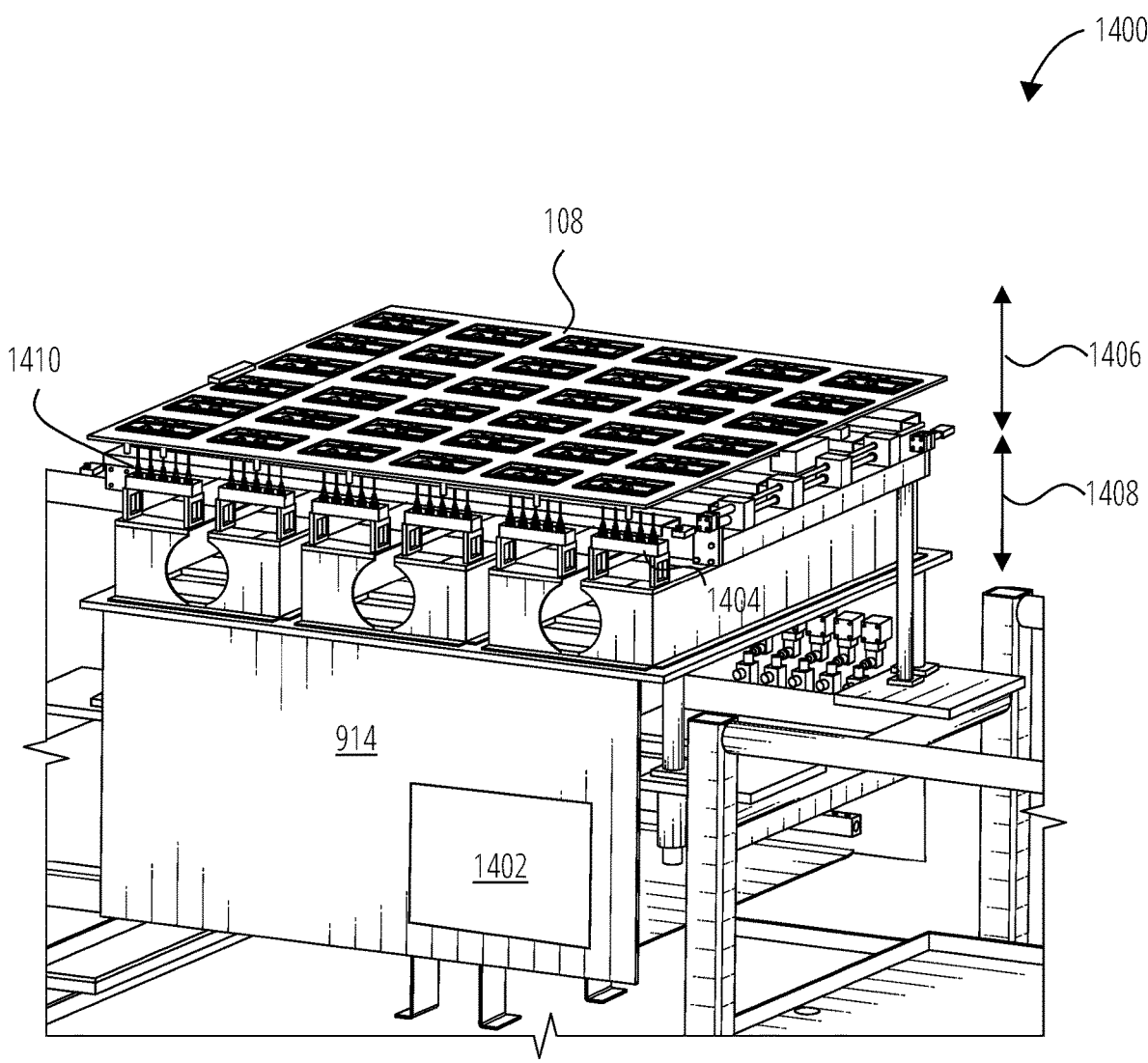
FIG. 14 illustrates a fertigation of growing tray with growing tray above nozzles 1400 in accordance with one embodiment.

Referring to FIG. 14, fertigation of growing tray with growing tray above nozzles 1400 is shown, illustrating how a growing tray may be positioned with respect to the fertigation system in order to fertigate plant vessels in the growing tray, in one embodiment. Once a growing tray 108 has been extracted from a grow module 100, another degree of movement, in addition to the horizontal relocation of the growing tray 108 as provided by the tray movement system 1000, may situate the growing tray 108 directly above and on at least one nozzle 1410 of the fertigation system.

When the growing tray 108 is extracted from the grow module by the tray movement system 1000, as previously described, it may be aligned in its precise horizontal position, e.g., above the nozzle manifold 914 and at least one nozzle 1410, by the action of the lower conveyor 912 (not shown). Under instructions from a control system 1402 and powered by a motor (not shown), the lower conveyor 912 may be adjusted such that the growing tray is repositioned vertically 1406, or the nozzle manifold 914 may be adjusted such that the nozzle manifold is repositioned vertically 1408. This configuration may be held for the duration of time needed for the fertigation process to complete. Once complete, the process may be reversed, raising the growing tray or lowering the nozzle manifold, such that the lower conveyor 912 may carry the growing tray away from the nozzle manifold. This motion may be controlled by a control system 1402 configured as part of the conveyer elements or the nozzle manifold 914.

Figure 15:
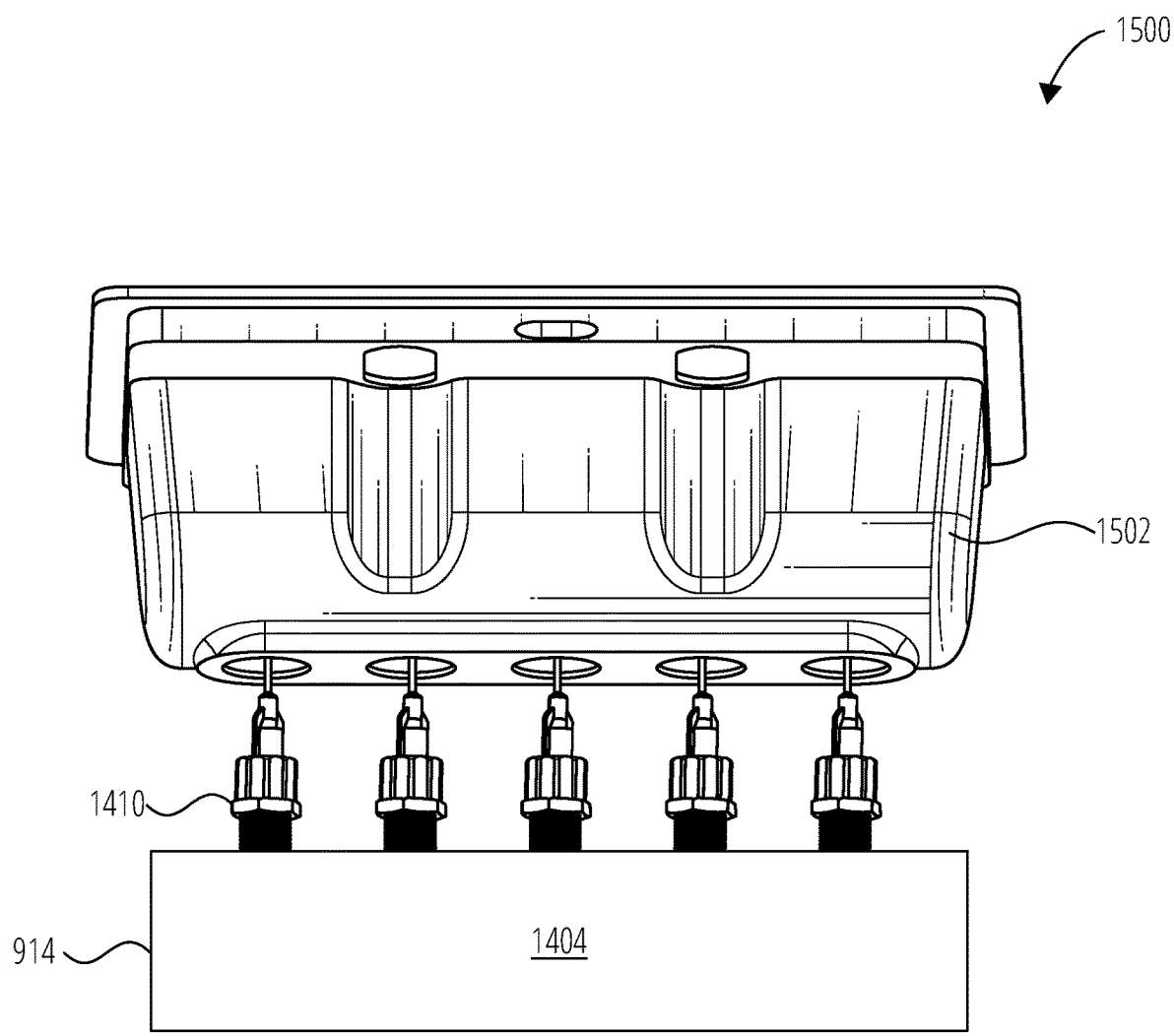
FIG. 15 illustrates an at least one nozzle and nozzle manifold 1500 in accordance with one embodiment.

Referring to FIG. 15, an at least one nozzle and nozzle manifold 1500 are illustrated. As FIG. 14 described how individual plant vessels are positioned in growing trays in a grow rack above a plurality of nozzles, this embodiment describes how water and nutrients from the nutrient supply are delivered to the plants, seeds or seedlings, and/or shoots of plants germinating and/or growing within each plant vessel.

As noted above in FIG. 13, a first pump within the fertigation system 1700 delivers a mixture of water and nutrients from the nutrient supply to the nozzle manifold 914, being in fluid communication with at least one of the first pump and a fresh water supply depending on the needs of the plants, seeds or seedlings, and/or shoots of plants in the fertigation system.

"Nozzle" in this disclosure refers to a cylindrical or round aperture at the end of a pipe, hose, or tube used to control a jet of a gas or a liquid. In a fertigation system, at least one nozzle may be configured at a nozzle manifold and used to control/inject water and/or nutrients and pressurized air into plant vessels. "Nozzle manifold" in this disclosure refers to a device or chamber capable of delivering liquid and/or gas substances, and branching into at least one nozzle.

The nozzle manifold 914 comprises a number of components, each playing a role in delivering the water/nutrient mixture from the day tank or a fresh water supply to individual plant vessels within the impervious outer vessel or tray insert 1502. The nozzle manifold 914 comprises a manifold header 1404 comprising the fresh water supply and/or mixture of fresh water supply and nutrient supply pumped to the nozzle manifold from the first pump. The manifold header 1404 then supplies said fresh water supply and/or mixture of fresh water supply and nutrient supply to the at least one nozzle 1410, configured to inject said liquids into the bottom of the plant vessels on a growing tray. The at least one nozzle 1410 may be a variable number, from a single nozzle to an many as may be accommodated by the manifold header 1404, configured to fertigate individual plants, seeds or seedlings, and/or shoots of plants contained within a plant vessel.

In one embodiment, the at least one nozzle 1410 may also inject pressurized air into either the nutrient chamber or substrate within the plant vessel as determined by the oxygen or other gaseous needs of individual plants, and/or shoots of plants. "Pressurized air" in this disclosure refers to a gas, or a combination of gases, put under greater pressure than the air in the general environment. Pressurized air may include air containing a typical mixture of elements found in the atmosphere, as well as highly concentrated oxygen, ozone, or nitrogen, or some specific combination of these elements in desired concentrations differing from atmospheric air.

Manifold Header

"Manifold header" in this disclosure refers to a solid, non-permeable casing separating and protecting a manifold chamber from the multiple openings with which is associated. In a fertigation system. The manifold header 1404 comprises a solid non-permeable casing separating the nozzle manifold 914 from the at least one nozzle 1410, for the reason of protecting the underlying manifold machinery (e.g., tank feeds, valves, and so on) from any residual materials (e.g., water, substrate) that may fall from the plant vessels in the growing trays held in place above it. The manifold header 1404 may be made of any non-reactive material, e.g., ⅛-¼ inch plastic, with the capacity for holes to be drilled through which the at least one nozzle 1410 may fit.

Figure 16:
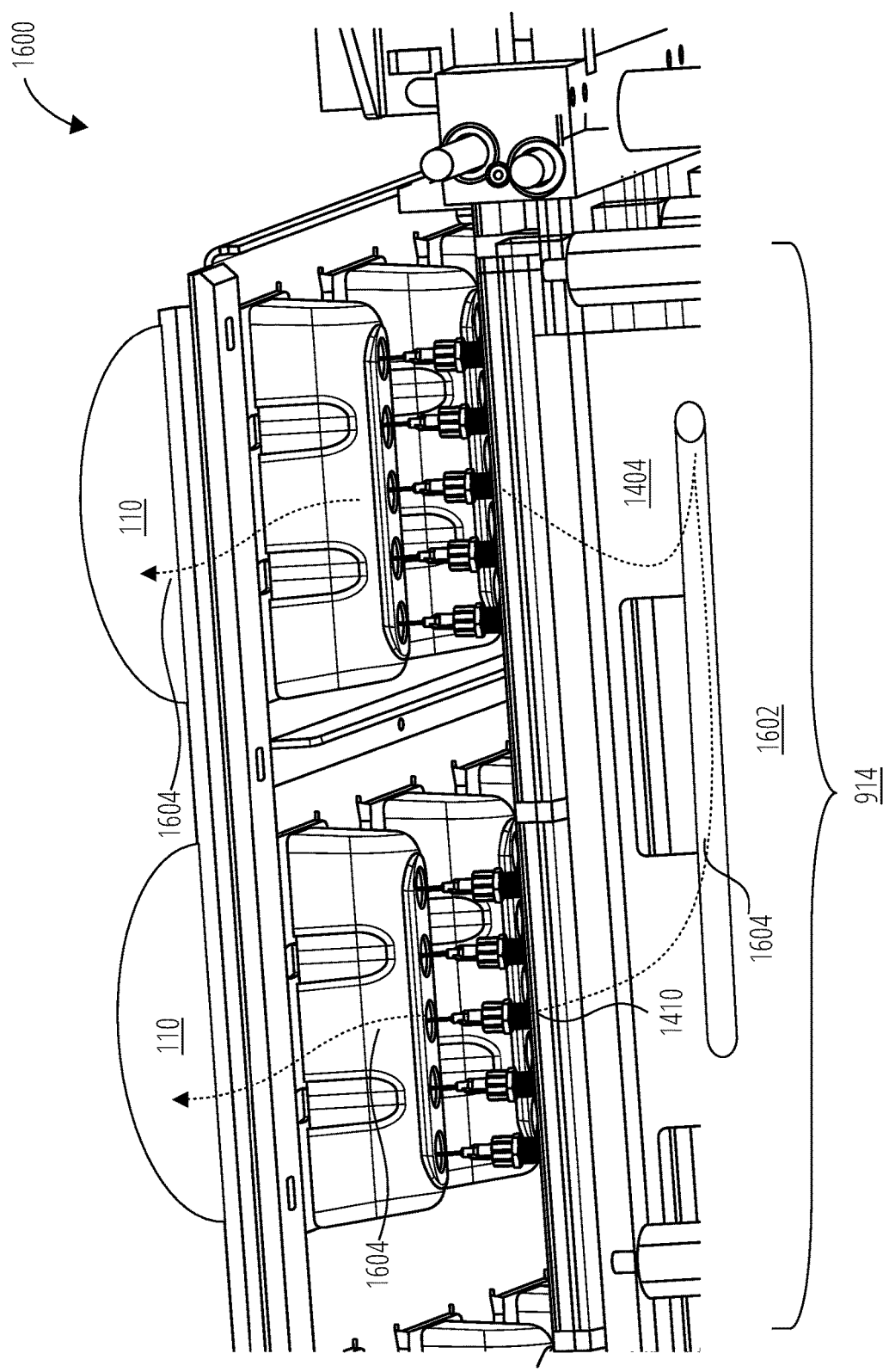
FIG. 16 illustrates a pressurized air in fertigation system 1600 in accordance with one embodiment.

Referring to FIG. 16, the utilization of pressurized air in fertigation system 1600 is illustrated. The nozzle manifold 914 may be configured to deliver pressurized air 1604 from a pressurized air system 1602 to the at least one nozzle 1410 that punctures the plant vessels 110 in a growing tray extracted from the grow module and positioned above said nozzle in the fertigation system. Pressurized air may be an important element delivered to either or both of the nutrient chamber and substrate of a plant vessel, particularly under growth conditions for said plants requiring oxygen, nitrogen or other gaseous elements able to be delivered via said at least one nozzle 1410 emanating from the manifold header 1404.

The delivery of pressurized air in fertigation system 1600 may need a separate means of access for said pressurized air 1604 to the nozzle manifold 914 for distribution to the at least one nozzle 1410. A separate nozzle manifold 914 to deliver pressurized air 1604 may be utilized or said pressurized air 1604 may be delivered via the same nozzle manifold 914 delivering water, nutrients, or some combination of the two, depending on the configuration of said nozzle manifold 914 (e.g., whether said nozzle manifold may accommodate separate nozzles for liquids and gasses). The means of accessing and supplying gaseous elements for plant growth to the nozzle manifold 914 may be similar to that for delivering water and/or nutrients to the nozzle manifold 914. A supply of the elements—in this case gaseous (e.g., oxygen, nitrogen, and so on)—may be manifested by a storage tank located within the fertigation system and transferred to the nozzle manifold 914 by an air pump able to transfer pressurized air 1604 in the pressurized air system 1602. Said storage tank, air pump, and a piping connection to the nozzle manifold 914, may be devices and configurations known to those skilled in the art for delivering pressurized air from a tank to a manifold.

In one embodiment the configuration of delivering pressurized air as described above may be under control of the control system in a manner consistent with said control system controlling the delivery of water and/or nutrients from the day tank to the nozzle manifold via the first pump and/or delivery from the mixing tank to the day tank via the second pump.

Figure 17:
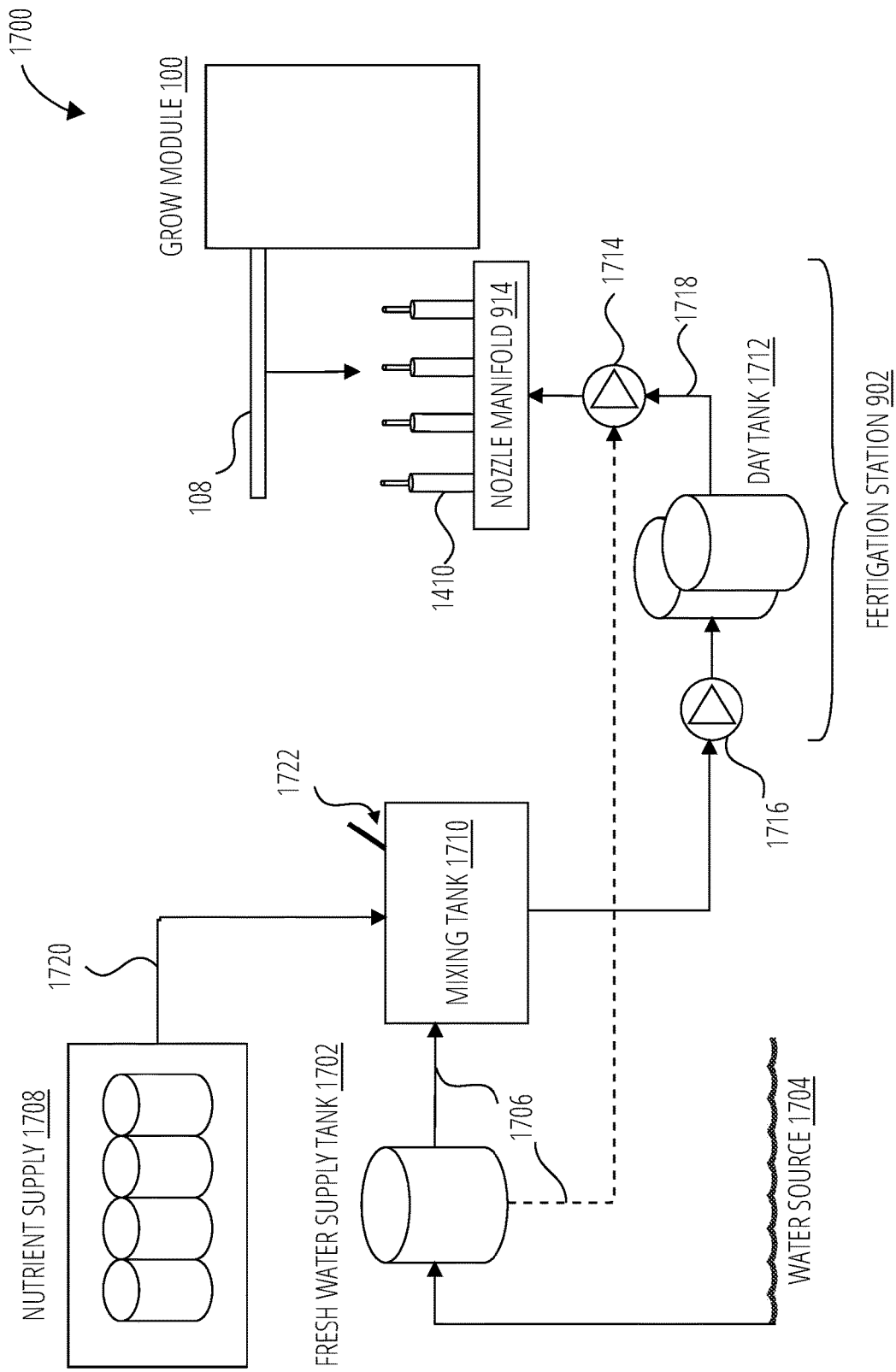
FIG. 17 illustrates a fertigation system 1700 in accordance with one embodiment.

Referring to FIG. 17, a fertigation system 1700 is illustrated. Embodiments of the system comprise a fresh water supply tank 1702, which having drawn water from a water source 1704, retains a fresh water supply. Said fresh water supply 1706 may feed a mixing tank 1710, or a fresh water supply 1706 may feed directly to the nozzle manifold 914 through a first pump 1714. The mixing tank 1710 receives the fresh water supply 1706 from the fresh water supply tank 1702 and nutrients 1720 from a nutrient supply 1708. The mixture of fresh water to nutrients, and the type and amount of nutrients, mixed in the mixing tank 1710 depends on the type(s) of plants, seeds or seedlings, and/or shoots of plants being supplied with fresh water and the nutrient supply 1708 in the fertigation system 1700. A nutrient/water mixture 1718 from the mixing tank 1710 may be fed by a second pump 1716 to a day tank 1712. The first pump 1714 may direct the nutrient/water mixture 1718 in the mixing tank 1710 to the nozzle manifold 914. The first pump 1714 may provide pressure to inject the fresh water supply 1706 or nutrient/water mixture 1718 into plant vessels for fertigation through at least one nozzle 1410 of the nozzle manifold 914.

Fresh Water Supply Tank

"Fresh water supply" in this disclosure refers to a source of non-saline water that may be used by plants. The fresh water supply tank 1702 comprises a container well known to those skilled in the art for retaining a fresh water supply for a fertigation system. Its size may be variable, from as small as 8 gallons (30 liters) to many times this capacity, depending on particular system needs—particularly as the source for both the mixing tank 1710 and a direct water feed to the nozzle manifold 914. The tank may be typically made from insulated steel or temperature resistant plastic and include connecting piping to the mixing tank 1710 and/or nozzle manifold 914 and first pump 1714.

Mixing Tank

"Mixing tank" in this disclosure refers to a container designed to combine at least two substances, one of said substances typically liquid. In a fertigation system, a mixing tank may combine a fresh water supply and nutrient supply in precisely calculated amounts designed for the fertigation of plants. The mixing tank 1710 comprises a container designed to combine a fresh water supply and nutrient supply in precisely calculated amounts designed for the eventual fertigation of the plants, seeds or seedlings, and/or shoots of plants in the system. The mixing tank 1710, like the fresh water supply tank 1702, may be of varying size depending on system need and also includes features such as translucency to ensure proper mixing in addition to supply measurement. Sources to the mixing tank may include the fresh water supply from the fresh water supply tank 1702 and nutrients from the nutrient supply 1708, each measured and controlled by input and shut-off valves. A drain valve may be included for emptying the tank as needed. The mixing tank may also include an opening for accepting non-liquid additives 1722, such as fertilizers or nutrients in the form of a powder.

Nutrient Supply

"Nutrient supply" in this disclosure refers to fertilizers, nutrient additives, mineral supplements, beneficial commensal microorganisms, and the like, to optimize the growth conditions of plants when mixed with water. The nutrient supply 1708 including the nutrients may comprise fertilizers, nutrient additives, mineral supplements, beneficial commensal microorganisms, and the like, to optimize the growth conditions of plants, seeds or seedlings, and/or shoots of plants once mixed with water and pumped to the nozzle manifold 914. Additionally, if so desired, the nutrient supply 1708 may also comprise effective amounts of pesticides, selective herbicides, fungicides or other chemicals to remove, reduce, or prevent growth of parasites, weeds, pathogens, or any other detrimental organisms. The formulation of nutrient recipes for the nutrient supply 1708 may be adjusted as appropriate for the variety of the plant produced and shipped.

Once a suitable nutrient/water mixture 1718 created from water from the fresh water supply tank 1702 and nutrients or other agents from the nutrients in the nutrient supply 1708 is reached, the nutrient/water mixture 1718 is pumped by a second pump 1716 to a day tank 1712. The day tank 1712 retains the nutrient/water mixture and, as per its name, feeds the mixture to the nozzle manifold 914 on a daily basis. The water/nutrient mixture in the day tank 1712 is pumped to the nozzle manifold 914 by utilizing a first pump 1714, so named as the first pump in the fertigation system 1700.

First Pump

"First pump" in this disclosure refers to a mechanical device using suction or pressure to raise or move liquids. The first pump 1714 may be a standard fluid pump known to those skilled in the art using pressure for transferring liquids between tanks in a fertigation system 1700 or from one tank to an outlet source like a nozzle manifold 914 or other container. The first pump 1714 may be electric-powered or use an alternate energy source (e.g., natural gas or propane) to create the needed pressure. The first pump 1714 may also have a suitable range of pressure (pounds per square inch, PSI) variability, e.g., from 5 to 90 PSI and flow range, e.g., from 10 to 2000 liters/hour to accommodate the flow between the day tank 1712 and the nozzle manifold 914. In some embodiments, the first pump is a peristaltic pump.

Second Pump

"Second pump" in this disclosure refers to a mechanical device using suction or pressure to raise or move liquids. The second pump 1716 may be a standard fluid pump known to those skilled in the art using pressure for transferring liquids between tanks in a fertigation system 1700 or from one tank to an outlet source like a nozzle or other container. The second pump 1716 may be electric-powered or use an alternate energy source (e.g., natural gas or propane) to create the needed pressure. The second pump 1716 may have a suitable range of pressure (pounds per square inch, PSI) variability, e.g., from 5 to 90 PSI and flow range, e.g., from 10 to 2000 liters/hour to accommodate the flow between the mixing tank 1710 and day tank 1712. In some embodiments, the second pump is a peristaltic pump.

Day Tank

"Day tank" in this disclosure refers to a non-reactive container for storing fluids to be used on a periodic, e.g., daily basis. For a fertigation system, a day tank may contain a time-limited supply of water and/or nutrients previously mixed in a mixing tank. The day tank 1712, as indicated by its name, contains a time-limited supply of fluid for the fertigation system 1700. Owing to the changing nature of its fluid supplies, and the customized nature of the delivery of same to the plants, seeds or seedlings, and/or shoots of plants, the fertigation system 1700 may not store its mixture of water and nutrient supply 1708 for longer than a day or so. The means of shutting off the supply from the mixing tank 1710 may be an input valve, utilized in synchronized fashion with the second pump 1716. The drain valve in the mixing tank 1710 may remove excess liquids unneeded by the day tank 1712 under particular conditions. Like the fresh water supply tank 1702 described above, the day tank 1712 may be typically made from insulated steel or temperature resistant plastic, though like the mixing tank 1710 it may in one embodiment be translucent to ensure proper mixing and a visual means of measuring supply. It may, like the fresh water supply tank 1702 and mixing tank 1710, be of varying size depending on system need.

Nozzle Manifold

"Nozzle manifold" in this disclosure refers to a device or chamber capable of delivering liquid and/or gas substances, and branching into at least one nozzle. The nozzle manifold 914 comprises piping or tubing for transporting liquids or air to an at least one nozzle extending from this component. In one embodiment the nozzle manifold 914 may be cylindrical in shape with the at least one nozzle extending from the top circular surface through a manifold header. In another embodiment the nozzle manifold 914 may be in the form of an elongated tube with the at least one nozzle extending from the side (e.g., curved portion) of said elongated tube. The nozzle manifold 914 utilizing an at least one nozzle may be in various shapes, configurations, and sizes suitable to puncture plant vessels situated in grow racks extracted from the grow module 100 and placed in the fertigation system 1700. The methods by which nozzles fertigate individual plants, seeds or seedlings, and/or shoots of plants with fresh water and nutrients are discussed in detail later in this disclosure.

Fertigation Station

A fertigation station 902 may be a location where plants undergo fertigation through the action of the components described above. In one embodiment, the fertigation station 902 may comprise the day tank 1712, the first pump 1714, the second pump 1716, and the nozzle manifold 914. Grow modules 100 may be brought to the fertigation station 902, and their growing trays 108 removed so that plants in the growing tray 108 may be fertigated. This process is described in greater detail in subsequent sections.

Figure 18:
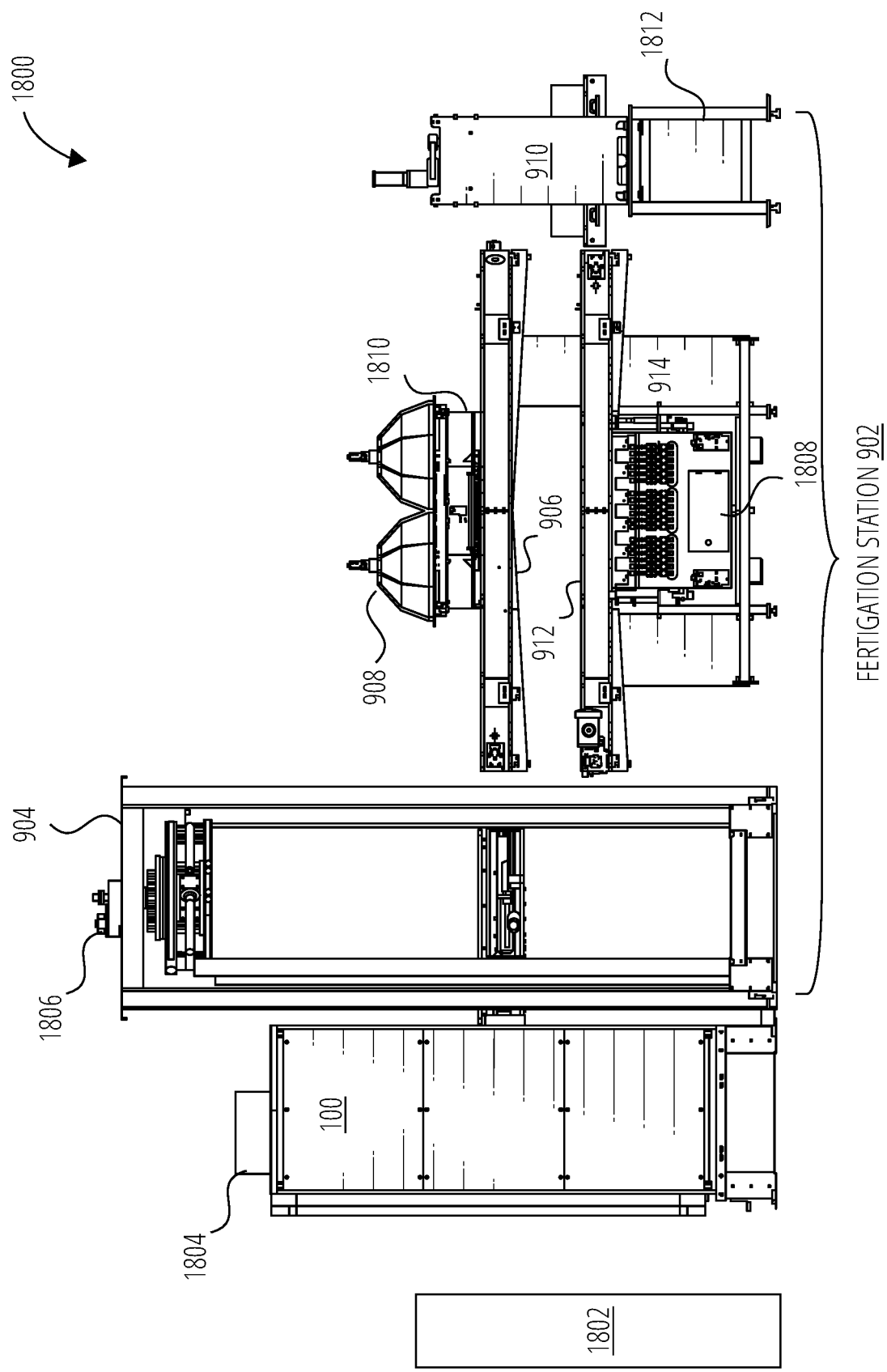
FIG. 18 illustrates a control system 1800 in accordance with one embodiment.

Referring to FIG. 18, an exemplary control system 1800 is illustrated. To provide a means to control at least the electrical, pneumatic, motive, and otherwise actuated and powered fertigation system components, the control system 1800 is disclosed. The control system 1800 may comprise a panel with electrical wiring and switches, typically contained within a secured metal enclosure or other container for shielding electrical wiring, switches and similar components for passing electrical power to other components such as drive mechanisms, pumps, and so forth, such as may be included in a stand alone cabinet, as indicated by control system 1802. In one embodiment, the control system 1800 may comprise panels with electrical wiring and switches in multiple locations, including but not limited to, the grow module 100, as indicated by control system 1804, the fertigation gantry 904 as indicated by control system 1806, the nozzle manifold, upper conveyor 906, and lower conveyor 912, as indicated by control system 1808, the imaging station 908 as indicated by control system 1810, the tray elevator 910, as indicated by control system 1812, and other components throughout a plant growing facility, for purposes of efficiency and balancing of electrical load between power usage specific to the grow module 100 (e.g., for lighting, fans, and so forth as previously discussed), the fertigation station, etc. The control system 1800 may additionally be configured manually by an operator or by automated or manual means under control of software able to send and receive commands to and from the control system 1800. Any means may be used for passing said commands to/from an electrical control system 1800 (e.g., containing a power source and electrical wiring and switches) as presently described.

Control System

"Control system" in this disclosure refers to a device including a processor, logic, electrical wiring, switches, and similar components, for controlling and passing electrical power to other components or devices. This may be housed within a secure enclosed container, typically metal or plastic, for shielding these components. In one embodiment, the control system may synchronize and optimize all aspects of the environment across the automated growing facility. This may be accomplished to meet plant needs with precision for optimal plant experience, growth, and harvest yield. The control system may receive sensor inputs indicating temperature, airflow, humidity, carbon dioxide levels, and other ambient or environmental variables in the growing chambers or other parts of the automated growing facility. The control system may adjust HVAC operation in order to counter, maintain, or enhance conditions indicated by sensor inputs.

In one embodiment, the control system may instruct the grow module transport devices to locate specific modules based on their machine-readable identification applied to each grow module. "Machine-readable identification" in this disclosure refers to a graphic or visible identifier able to be interpreted without human interaction. Exemplary machine-readable identification includes RFID or NFC devices, barcodes and quick response codes. The control system may also provide the grow module transport devices with the grow module's known location, known time elapsed since plants in a grow module were last fertigated, or other parameters. The control system may thus instruct a grow module transport device to find specific grow modules and transport them to appropriate stations based on algorithms or protocols determined for facility operation, and based on known locations of stations throughout the facility.

In one embodiment, the control system may receive information on the type of plants intended to be fertigated, the phase of growth plants within a grow module have reached, based on time elapsed since planting, images captured of the plants, or other data. Based on this data, a nutrient input system may distribute desired levels of desired nutrients into the mixing tank. The control system may control an amount of fresh water mixed with the nutrients, a duration of mixing, and the addition of other elements. The control system may instruct a pump to move the nutrient/water mixture from the mixing tank to a day tank or a tank for immediate use at the fertigation station. Based on machine-readable identification for a grow module brought to the fertigation station, as well as machine-readable identification for growing trays pulled from the grow module for fertigation, the control system may control the timing, speed, and duration of operation for a pump delivering the nutrient/water mixture to the nozzle manifold.

In one embodiment, the control system may control the operation of the fertigation gantry lift, the tray movement system, the upper conveyor and lower conveyor, the camera tunnel or imaging station (having at least one camera) and the tray elevator of the fertigation station. In this manner, based on weight or location sensors in one embodiment, the control system may control the movement of growing trays as they are removed from the grow module, placed on the conveyors, imaged, fertigated, and returned to the grow module. The control system may read a machine-readable identification provided on the growing tray, as well as imaging data captured by the at least one camera, to determine the motion, speeds, durations, etc., for which each growing tray may be handled with optimal consideration for the needs of the seeds, seedlings, shoots of plants, or plants disposed within that growing tray. As indicated by the weight of plant vessels or other considerations, the control system may instruct a vessel clamping system operating in concert with the injection system such that plant vessels are secured and will not dislodged from or disrupted within their growing tray during fertigation.

In one embodiment, the control system may receive input from sensors within the grow module, indicating temperature, humidity, airflow, or other conditions within the grow module. Based these inputs, in conjunction with known time elapsed since planting, imaging data for plants within the growing trays of the grow module, and/or other parameters, the control system may control a ventilation system for the grow module, as well as lighting channels powering LED patterns in the lighting arrays of the light trays within the grow module. In this manner and as previously described, conditions experienced by seeds, seedlings, shoots of plants, and plants within the automated growing facility, such as temperature, humidity, airflow, carbon dioxide levels, water, nutrients, light intensity, wavelength, and exposure, and more, may be controlled across the facility and down to a tray-by-tray or plant-by-plant granularity by the automated growing facility's control system.

Figure 19:
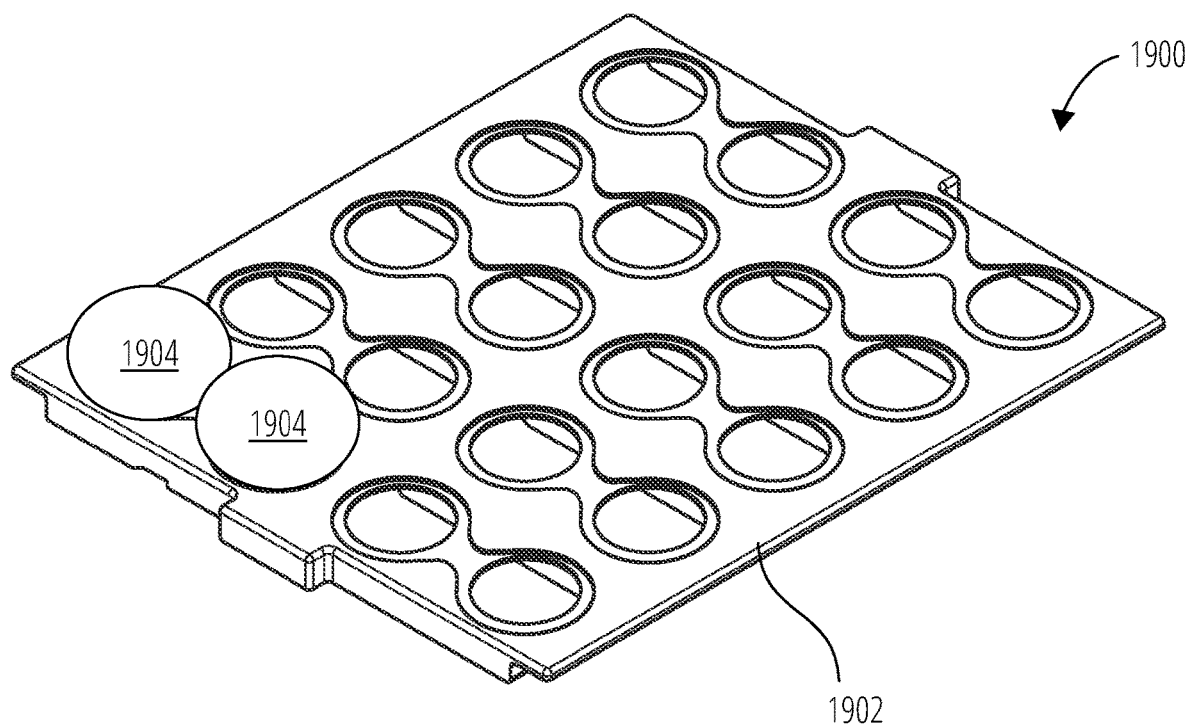
FIG. 19 illustrates a growing tray and plant vessels 1900 in accordance with one embodiment.

Referring to FIG. 19, a growing tray and plant vessels 1900 is illustrated.

In an embodiment, a plurality of grow racks may hold a variable number of plant vessels, each plant vessel 1904 containing plants, seeds or seedlings, and/or shoots of plants. The number and type of plants, seeds or seedlings, and/or shoots of plants in the plant vessels in the grow racks may be configured according to their collective fertigation needs, that is the lighting, air, and liquids needed for effective germination and growth. "Plant vessel" in this disclosure refers to a container designed to facilitate individual plant growth. The plant vessel may include an outer membrane, an impervious outer vessel, a cover, a substrate, a nutrient chamber, a pervious membrane, and a root zone.

Each grow rack containing a plurality of plant vessels may be contained within a growing tray 1902. As previously described, plants, seeds or seedlings, and/or shoots of plants growing in separate plant vessels may be collected into grow racks according to their collective needs. Said grow racks, positioned into the growing tray 1902, may be extracted from the grow module by a tray movement system.

Figure 20:
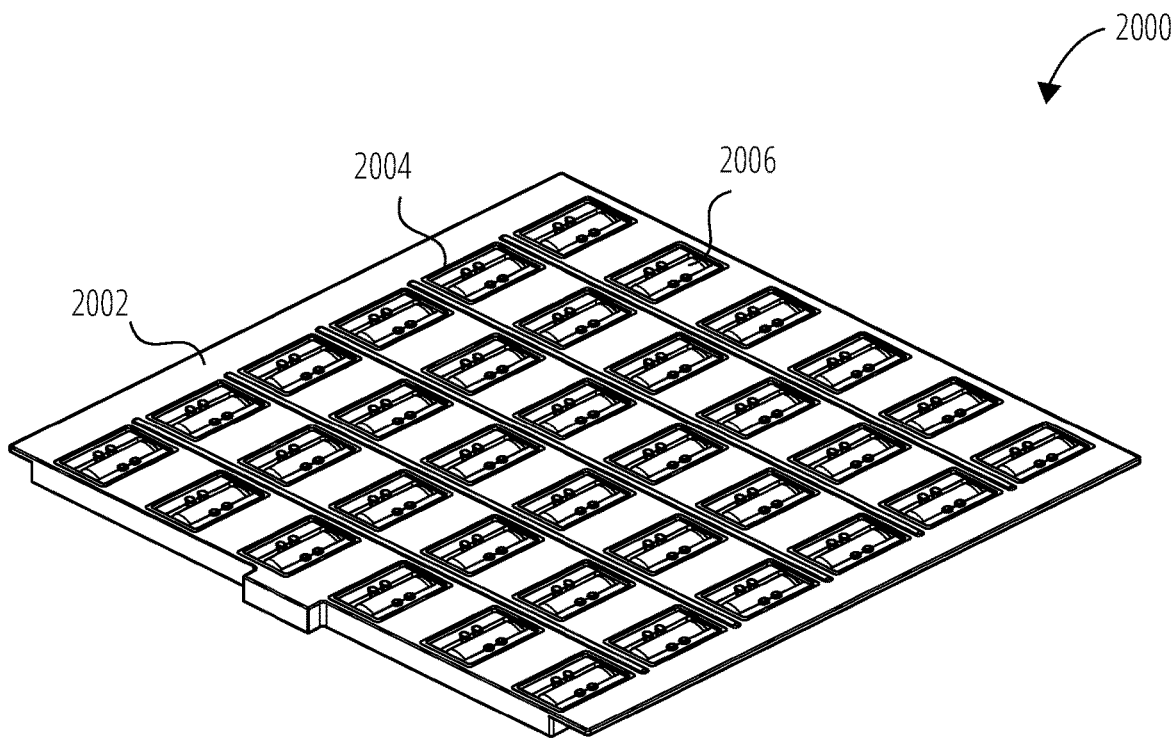
FIG. 20 illustrates a growing tray with tray inserts and plant vessels 2000 in accordance with one embodiment.

FIG. 20 illustrates a growing tray with tray inserts and plant vessels 2000 in accordance with one embodiment. This growing tray 2002 may be configured to accept tray inserts 2004 designed to accommodate sausage-type plant vessels 2006. Other vessel types may be accommodated, either with or without tray inserts, depending on their configuration. Additional embodiments are described below.

Figure 21:
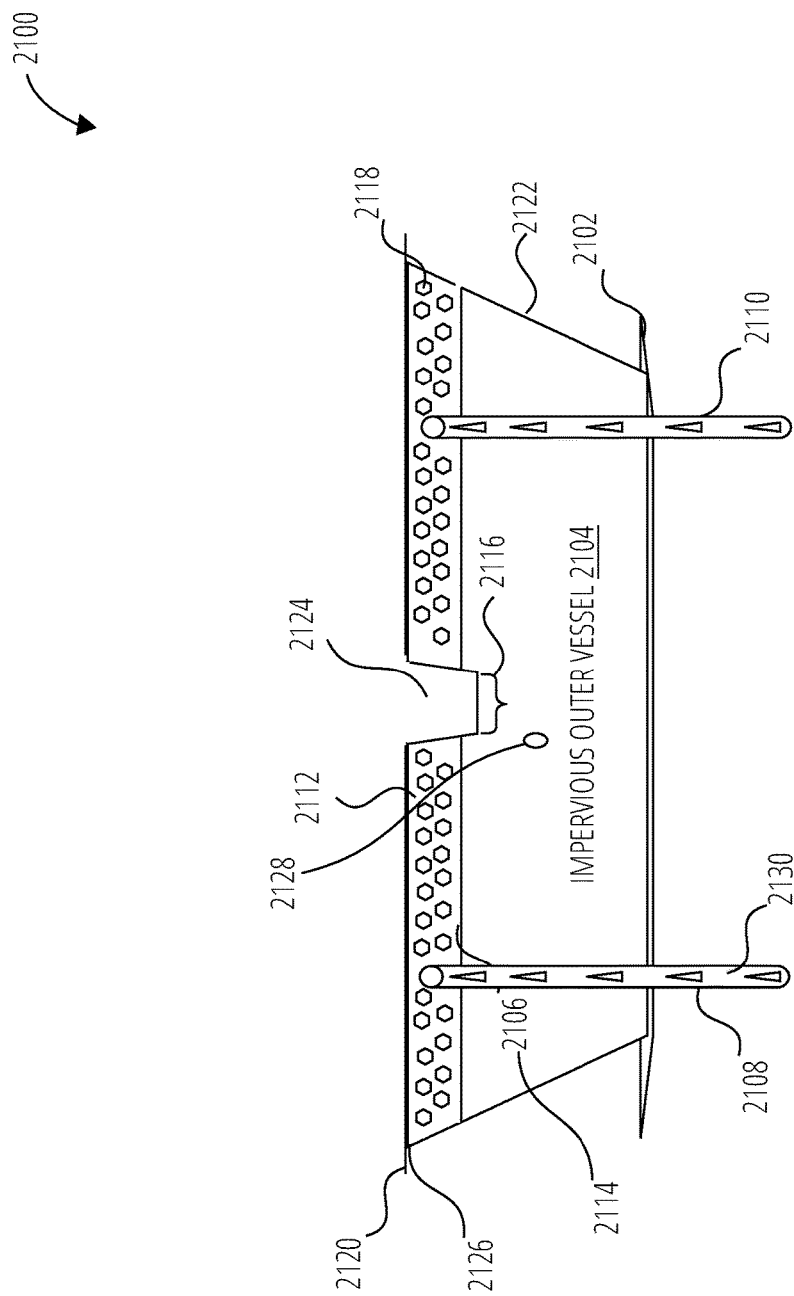
FIG. 21 illustrates a plant vessel 2100 in accordance with one embodiment.

Referring to FIG. 21, a plant vessel 2100 is illustrated. An impervious outer vessel 2104 shows two stratified layers within its vertically oriented walls 2122: an upper nutrient chamber containing nutrients 2118 and a substrate 2114 layer containing a root zone and organic materials providing for the growth of seeds or seedlings. "Nutrient chamber" in this disclosure refers to a stratified layer within an impervious outer vessel containing nutrients for plant fertigation purposes. The nutrient chamber may be formed between a cover and a pervious membrane. A pervious membrane 2106 separates these two stratified layers, composed of a number of materials, such as membrane materials, with its permeability gauged according to specific the specific plant type being grown. "Pervious membrane" in this disclosure refers to a type of biological or synthetic membrane allowing materials, typically but not exclusively liquids, to pass through it by diffusion. The impervious outer vessel 2104 additionally contains a base 2102 for the purpose of retaining excess water or substrate during transport or when individual plant vessels are contained within a fertigation system. "Impervious outer vessel" in this disclosure refers to a plant vessel including vertically oriented walls and a base. The impervious outer vessel may also include a cover, and a top rim. "Base" refers to the lowest portion or edge of an object, typically upon which the object rests or is supported. The top of the nutrient chamber 2112 comprises both a top rim 2126 and a cover 2120 forming a seal at the top rim to ensure enclosure of the nutrients 2118. "Top rim" in this disclosure refers to the upper or outer edge of an impervious outer vessel, typically circular or approximately circular. "Vertically oriented walls" in this disclosure refers to supports of an object at substantially right angles to a horizontal plane; in a direction, or having an alignment, such that the top is directly or approximately above the bottom.

The cover 2120 contains a circular opening, a seed pocket 2124, into which seeds or seedlings 2128 are deposited into the substrate 2114 through an aperture 2116. "Pocket" in this disclosure refers to a cavity containing a deposit, such as seeds, seedlings, or shoots of plants. Note the horizontal level of said aperture 2116 is below the pervious membrane 2106, ensuring that the deposited seeds or seedlings 2128 avoid direct contact with the nutrients 2118 is the nutrient chamber 2112. The nutrients 2118 within the nutrient chamber 2112 are isolated from the seed pocket 2124, where a portion of the pocket proximate to the nutrient chamber 2112 is isolated from the nutrient chamber by a portion of the cover 2120 being sealed to the pervious membrane 2106, such that the nutrients 2118 do not come in contact with seeds or seedlings in the seed pocket 2124.

A fertigation system provides for water 2130 being added to the impervious outer vessel 2104. The fertigation system commences with a freshwater supply being pumped through a plurality of nozzles puncturing the base 2102 of the impervious outer vessel 2104. A raw water nozzle 2108 or raw water nozzle 2110 supplies water 2130 to either the nutrient chamber 2112 or substrate 2114, depending on the fertigation needs of an individual plant or set of plants. In particular, plants in the form of seeds or seedlings 2128, e.g., in early development stage, may need water 2130 in the substrate 2114 but not in the nutrient chamber 2112 since the latter may be both unnecessary and potentially harmful until germination. Once the seeds or seedlings 2128 have germinated and are ready to receive diluted nutrients, water passing through the raw water nozzle 2108 or raw water nozzle 2110 enters the nutrient chamber 2112 in precisely measured amounts calibrated to the type of plant or plants whose seeds or seedlings have germinated. The nutrients 2118 mixed with water 2130 from the nozzles then pass through the pervious membrane 2106 to enter the substrate 2114 stratified layer and fertilize the germinated seeds or seedlings. The amount of permeability of the pervious membrane 2106 is again calibrated to the type of plant or plants whose seeds or seedlings have germinated.

Plant Vessel

The plant vessel 2100 (i.e., container) may be made of any appropriate material for facilitating storage of a plant. The basic requirements include the ability to isolate the root mass and substrate 2114 with a relative moisture barrier. It is also preferred that the plant vessel 2100 material be able to withstand minor impacts without breaching the barrier provided. Finally, materials are optimally chosen to avoid leaching of chemicals into the substrate 2114.

In some embodiments, insulating materials are preferred for the plant vessel 2100. For example, if known shipping conditions may expose the plants to drastic temperature fluctuations, an insulated plant vessel 2100 material may buffer the root mass and provide more stable temperature in the substrate 2114. Thus, it may be desirable if extreme temperature increases may be avoided during the heat of the day, but meanwhile some of that substrate heat is retained into the cool of the night. Furthermore, an insulated material may reduce shock experienced with quick temperature fluctuations to which many plants are susceptible. Slower temperature changes help keep the turgor pressure of the plant steady and maintain nutrient uptake and overall plant health, whereas a rapid temperature change disrupts this pressure and slows or temporarily stays the uptake of the plant and results in poor development and health.

Exemplary, non-limiting materials for the plant vessel 2100 include appropriate plastics (e.g., polystyrene, polystyrene foam, or polypropylene) and cellulose (with optional water barrier), and the like. Plant vessel 2100 material may be sourced from plant-based materials to minimize environmental impact due to their biodegradability and renewability. For example, plant vessel 2100 material may be sourced from soy, corn, potato, soybeans, and the like.

In some embodiments, the plant vessel 2100, in single modular form, may have an internal volume from about 5 to about 500 cubic inches, from about 5 to about 100 cubic inches, from about 10 to about 75 cubic inches, from about 10 to about 50 cubic inches, and from about 10 to about 25 cubic inches. In some embodiments, the plant vessel in single modular form has an internal volume of about 5, 7, 10, 15, 20, 25, 30, 35, 40, 50, 75, 100, 150, or 200 cubic inches.

While the plant vessel 2100 assembly is described above and illustrated as a single and distinct unit, the disclosed plant vessel 2100 assembly may be repeated and/or serially expanded into an assembly with a plurality of connected plant vessel 2100 (e.g., with plants contained therein), such as a tray or rack of one or more rows of plant vessels.

Cover

"Cover" in this disclosure refers to an object that lies on, over, or around another object, especially in order to protect or conceal it.

As indicated above, the plant vessel 2100 assembly comprises a pliable cover substantially sealed against the plant vessel 2100. Typically, the cover 2120 is substantially sealed against the top rim 2126 of the plant vessel 2100. The sealing is typically completed after the substrate 2114 is placed into the interior space of the plant vessel 2100. In some embodiments, the sealing is completed without a seed or plant part in the substrate 2114. The seed or plant part may be inserted later through the aperture 2116 in the cover 2120.

The term "substantial sealed" and grammatical variants thereof indicate that contact is maintained between the cover 2120 and the plant vessel 2100 such that it substantially impedes air or vapor communication between the interior and exterior of the impervious outer vessel 2104 to prevent non-transpiration water loss. In this regard, it is preferred that the majority of all water loss from the interior of the impervious outer vessel 2104 be the result of plant transpiration (i.e., when the plant has a leaf mass on the exterior of the plant vessel 2100) and not from evaporation and airflow between the interior space and the exterior. Use of "substantial" indicates that some evaporation or leaking is permitted, but the escape is slowed to maintain sufficient hydration within the substrate 2114 for a prolonged period of time. The sealing may be implemented according to any appropriate method known in the art, including use of heat sealing (to bond components together), gluing, or use of fasteners, such as clamps, elastic bands, and the like, to maintain a substantial seal.

The pliable cover 2120 has at least one aperture 2116 that is sufficiently large to provide ambient light penetration into the interior space of the plant vessel 2100 such that the shoot extending from a germinating seed may extend upward through the aperture 2116. However, the aperture 2116 may simultaneously be sufficiently small to allow contact with the sides of the stem of the growing plant once it grows through the aperture 2116. Thus, the aperture 2116 is smaller than the crown of the plant being produced when at its mature stage of growth. The contact between the stem and the aperture 2116 edge provides an additional seal to substantially prevent escape of humidity and, thus, preserve the hydration of the root mass while maintaining a lower humidity for the leaf mass. "Aperture" in this disclosure refers to an opening, hole, or gap, specifically through which shoots or shoots of plants would pass during growth.

The cover 2120 is a pliable cover. The term "pliable" is used to indicate that the cover 2120 is flexible and may be moved or bent with the application of pressure. Typically, the cover 2120 is overlaid on the plant vessel 2100 in a relatively taut configuration and sealed against the rim of the plant vessel 2100, as described above. As the plant shoot/stem penetrates through the aperture 2116, the edge of the aperture 2116 contacts the stem to create a seal by function of the pressure applied by the stem. As the stem grows and expands in diameter, the stem applies additional pressure on the edge of the aperture 2116 in the cover 2120. Due to the pliability of the cover 2120, the cover 2120 yields to the increased pressure applied by the growing stem and the aperture 2116 expands to accommodate the increased stem width. Preferably, the pliability is such that the seal is maintained while not significantly impeding the growth of the stem.

The nature of the material used for the cover 2120 may be determined by taking into account the specific plant variety of plant produced and stored in the plant vessel 2100. The weight and composition of the membrane material may be strong enough to stay adhered to the plant vessel 2100 and withstand the elements during storage/transport and growth of the plant. However, the cover 2120 may still be pliable enough to allow the crown/stem of the plant to stretch and displace it while maturing (as described above).

Exemplary cover 2120 materials include sheets of plastic, foil, and the like. Illustrative, non-limiting examples of cover materials include: polystyrene, polypropylene, foil and metallic materials, plant-based polymers (e.g., sourced from corn, potato, soybeans, and the like). The membrane may be any degree of opacity. In some embodiments, the cover material is capable of receiving print or embossing to accommodate branding or other markings.

In some embodiments, the cover 2120 is substantially planar. However, in some embodiments, the cover has some topography configured to permit air to circulate in channels even if a planar leaf is disposed against the cover. For example, pronounced embossing of the membrane material, such as foil, which is capable of holding its embossed pattern, may create channels of airflow by creating separation from a contacting leaf. The channels prevent the decay of leaves that contact the membrane for extended periods of time during the production and distribution process. While the leaves do not require significant ventilation, the air channels prevent leaf suffocation due to lamination of the flat surface of the leaves to the flat surface of a flat membrane. A certain variation of texture of this membrane that created enough separation between the leaves and membrane, even if just a "course" texture, or channeling, may suffice to prevent this suffocation and decay, for extended periods of time.

The number of apertures and the size of the apertures may vary depending upon the variety of product being produced. In some embodiments, the at least one aperture 2116 in the cover 2120 ranges from about 1/16 inch to about 3/8 inch, depending upon the variety being produced.

The number and spacing of multiple apertures also depend upon the variety of the product and the end product desired. Micro greens, edible flowers and nutritional grasses may grow better with a frequency of up to about 30-40 apertures per square inch in the cover 2120. In contrast, plants with small leaf mass per seed, such as spinach, may grow better with about 1-5 apertures per square inch, such as 1-2 apertures per square inch, to achieve the foliage density desired. Heading lettuces typically use one aperture in the center of the plant vessel 2100, unless a mix or blend of lettuces in a single plant vessel 2100 is desired.

In some embodiments, the plant vessel 2100 assembly contains a mix of multiple plant types (e.g., lettuces). For example, in the embodiment with multiple lettuce varieties, about 3-5 apertures may be placed evenly around the near perimeter of the membrane. The different varieties of lettuce are placed in these apertures, resulting in a single plant vessel 2100 with a mix of living lettuce/greens in a single product. The benefit of this specific embodiment for the producer is that this "mixed" product is produced in a much shorter time frame as the goal is to realize 3-4 petite products, taking 20-30 days of growing time as opposed to a single variety of lettuce requiring up to 50 days in the system in order to reach full size. The benefit to the consumer is that one may otherwise have to purchase 3-4 separate products in order to realize this mix, or be confined to purchasing a "cut" mixed product of compromised freshness, longevity, appearance, and nutritional value.

Pervious Membrane

The pervious membrane 2106 may be made of any material that allows nutrients and water to flow through but allows the separation of the nutrients 2118 from the substrate 2114.

Nutrient Chamber

The nutrient chamber 2112 may include nutrients 2118 of any variety that is beneficial for a specific type of plant. Examples include nitrogen, phosphorus, potassium, and calcium, but are not limited thereto.

The nutrient chamber 2112 may be constructed by creating seals between the pervious membrane 2106 and the cover 2120, both at the outer diameter near the portion of the cover applied to the top rim 2126, and around the pocket portion of the cover. Nutrients 2118 may be added before either seal is created, thereby forming the nutrient chamber 2112.

In another embodiment, the nutrient chamber 2112 may be formed by starting with a pillow shaped chamber with one side constructed of cover material and the other side constructed of pervious membrane 2106 material, filled with nutrients 2118, that is sealed around its circumference and is approximately the same size as the top rim 2126 of the plant vessel 2100. A center portion of the pervious membrane 2106 is sealed to the center portion of the cover material to create the pocket (without an aperture 2116). In an embodiment, the pocket is formed and an aperture 2116 inside the pocket is made as part of the sealing process.

Substrate

The composition of the substrate 2114 (i.e., growth medium) is determined by the known requirements of the plant or plants being cultivated in the plant vessel 2100. For example, different compositions of soils are known for applications in cultivating a wide variety of edible and ornamental plants.

The substrate 2114 may also comprise the additions of fertilizers, nutrient additives, mineral supplements, beneficial commensal microorganisms, and the like, to optimize the growth conditions. Additionally, if so desired, the substrate 2114 may also comprise effective amounts of pesticides, selective herbicides, fungicides or other chemicals to remove, reduce, or prevent growth of parasites, weeds, pathogens, or any other detrimental organisms. The formulation of nutrient recipes for the substrate 2114 may be adjusted as appropriate for the variety of the plant produced and shipped. In some embodiments, the nutrient formulation may be modified by augmenting or even reducing specific minerals to optimize and regulate the growth rate of the plant within the packaging, and maintain or enhance the color of the plant. To illustrate, if a basil plant is suddenly placed in a dark environment for an extended period of time, the plant may initially accelerate its growth rate in an attempt to "reach" for and regain the sunlight it no longer receives. This type of rapid growth is problematic for packaged plants because it exhausts the energy and nutrient stores of the plant. Specific mineral recipes may reduce or slow this growth spurt during the storage conditions, thus preserving and promoting long-term vibrancy of the plant. In addition, nutrient formulations may be routinely adjusted to promote keeping color and crispness while plant is packaged and in transport.

Optimized choice and assembly of the substrate 2114 may thus be based on various considerations of the plant being cultivated. A brief discussion of considerations is provided. First, different varieties of plants have different root structures within the plant vessel 2100. The size (length and girth) of "mature" roots may occupy a large portion of the "limited" space within the plant vessel 2100. This may necessitate the use of an absorbent and expansive material within the substrate to temporarily expand and occupy the substantial volume within the plant vessel 2100 during germination. When at germination or early in the growth phase, the plant vessel 2100 volume is preferably filled mostly with substrate in order to support the seed or young plant mass near the top and aperture 2116 of the membrane. The substrate is also ideally stable, minimized voids or shifting, to ensure that the seed/seedling remains stable and in its position at or near the aperture 2116 for a sufficient time to allow for germination extension of the stem through the aperture 2116 and for the roots to penetrate into the substrate. As the roots increase in quantity and size, they may be able to "displace" this originally expanded material and utilize the volume of area that the expandable material was occupying. This allows the roots to fully mature and develop without becoming root bound and compressed too tightly within the plant vessel 2100.

Second, nitrogen, phosphorus, and calcium are nutrients that contribute to rapid growth cycles of many plant varieties of interest. Many plant varieties typically consume large amounts during their rapid growth cycle. These nutrients may not be "organically" sourced for water in water-soluble methods of growing and are not compliant with the National Organic Program (NOP) and United States Department of Agriculture (USDA). This means that "Organic Certification" as a hydroponic facility is not possible. To overcome this and to facilitate organic certification, calculated amounts of approved "organic" nitrogen, phosphorus and calcium nutrients may be included in the substrate 2114. However, to avoid problems of "nutrient toxicity", i.e., burning from the intense sources of concentrated fertilizers, while still providing sufficient sources of nitrogen, phosphorus and calcium, the organic sources may be preprocessed prior to incorporation. This preprocessing entails exposure to relevant microbial activity before they are added. The exact quantities of the desired nutrients are calculated for the full growth and expression of the subject plant. The source nutrients are initially provided in compressed, pelleted form. The pellets are introduced to a small colony of beneficial bacteria within this substrate combination. As the microbial activity commences, the colony of bacteria is small and thus processes a small amount of the organic nutrients. As this processing continues, the byproducts of this microbial-driven breakdown are now able to be taken up by the plants' roots. As time goes on, the colony of bacteria and microbial activity increases, resulting in more and more nutrients being made available to the plant roots. Because the reproduction of this microbial colony is exponential, so is the processing and availability of the nutrients. This process results in a controlled time release of absorbable forms of the nutrients. This process prevents nutrient toxicity in the beginning stages of the plants' development and provides amounts of absorbable nutrients commensurate with the growing demand of the growing plant, including in the final trimester of growth when the demands are highest. This process is critically essential to the success of growing fully expressed plants in exceptionally small and sealed plant vessels.

Third, considering that the plant vessel 2100 is sealed, the additional oxygen to the root system may enter by way of introducing the water for hydration. Oxygen is contained in or on the surface of the water and is carried to the plant roots. If this oxygen level is not sufficient, organically approved oxidizing agents may be added to the substrate to promote further oxygenation in the root zone.

In some embodiments, the substrate 2114 further comprises a thickening agent. The thickening agent creates an effect that is similar to a naturally occurring event in the plant's life. When the end of a growing season is nearing, the plant may experience certain environmental signals that induce the plant to produce latex. The environmental signals are often based on increasing scarcity of resources. For example, the length of day shortens, sunlight intensity reduces, hydration might reduce, or food for the plant is scarce. Latex in a lettuce plant, for example, is thicker than water and very bitter in taste. The plant produces this latex to slow circulation and, thus, slow the perishing process and extend its life long enough for the plant to quickly go to seed and flower for self-preservation of the species. Like natural latex, the thickening agent slows the plant's transpiration rate and, thus, slows the plant's uptake of water from the substrate 2114 during the prolonged period of storage in the plant vessel 2100 assembly. Furthermore, the metabolism and growth is correspondingly slowed and, thus, conserves nutrients. This effective "rationing" of water maintains the moisture level in the substrate 2114 for a longer period of time and prevents the plant from exhausting the life supporting resources during shipping. This extends resiliency of the plant during storage of and improves the final product in the marketplace.

Exemplary, non-limiting thickening agents include agar and gelatin-based products.

Agar-agar is a vegan based gelatin, made from algae. Agar-agar may be used, depending on the shelf life extension desired, with certain varieties of produce. By mixing this gelatin in water, with a specific ratio, one may manipulate the viscosity of water (with or without nutrients). By increasing the viscosity (slightly thickening the water to a mild gelatin-like substance), the circulation of water throughout the plant slightly coagulates and slows. This slows the uptake of this moisture by the plant. It also slows the transpiration (moisture emitted from leaf surface) of the plant. By doing so, the moisture in the plant vessel 2100 lasts longer, as the plant is using it more slowly.

While not all varieties necessitate the use of a thickening agent, or agar-agar, it may be included for most plants at various concentrations depending upon the desired shelf life and expected environmental conditions likely to be experienced during distribution and subsequent display. To illustrate, a single lettuce plant and variety in a six-ounce plant vessel 2100 may contain four-five ounces of hydration. In this example, one-two parts agar-agar to 99-98 parts water (respectively), is beneficial for maintaining long term vibrancy of the lettuce. The concentration and water content relative to the substrate 2114 may be further optimized based on the plant variety and intended use.

Figure 22:
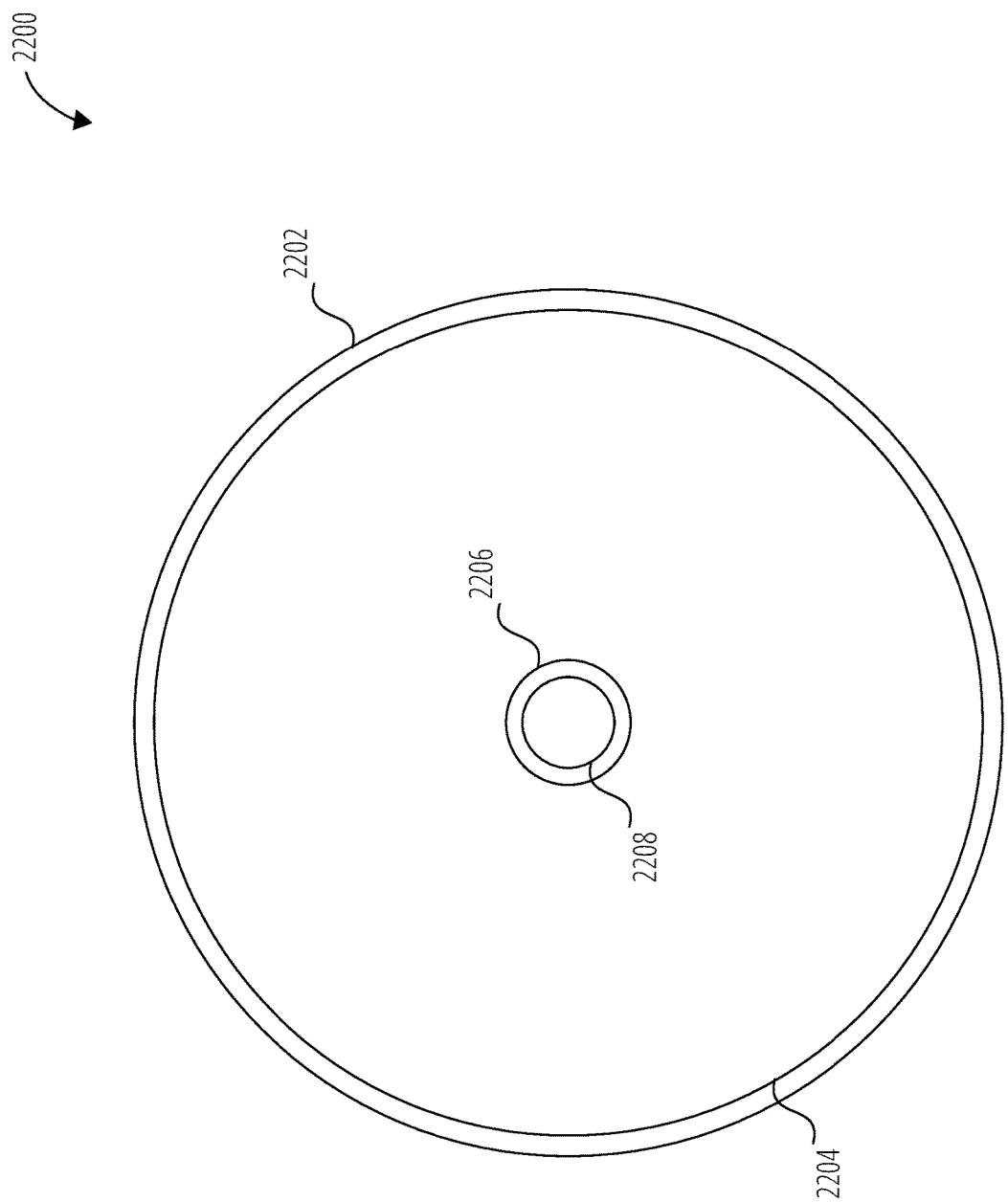
FIG. 22 illustrates a plant vessel top view 2200 in accordance with one embodiment.

Referring to FIG. 22, the plant vessel top view 2200, illustrating the top view of the plant vessel 2100 as shown in FIG. 21. As shown, the circular cover 2202 fits over the smaller but also circular top rim 2204, forming a seal to encase the nutrients in the uppermost stratified layer of the impervious outer vessel. At the center of both the cover 2202 an underlying top rim 2204, a seed pocket 2206 forms a circular cutout in the center of both the top rim 2204 and cover 2202. At the base of the seed pocket 2206, an aperture 2208 provides an opening through which a growing plant forms a seal preventing the nutrients in the nutrient chamber from harming the seedlings or shoots of plants growing up through the seed pocket 2206.

Figure 23:
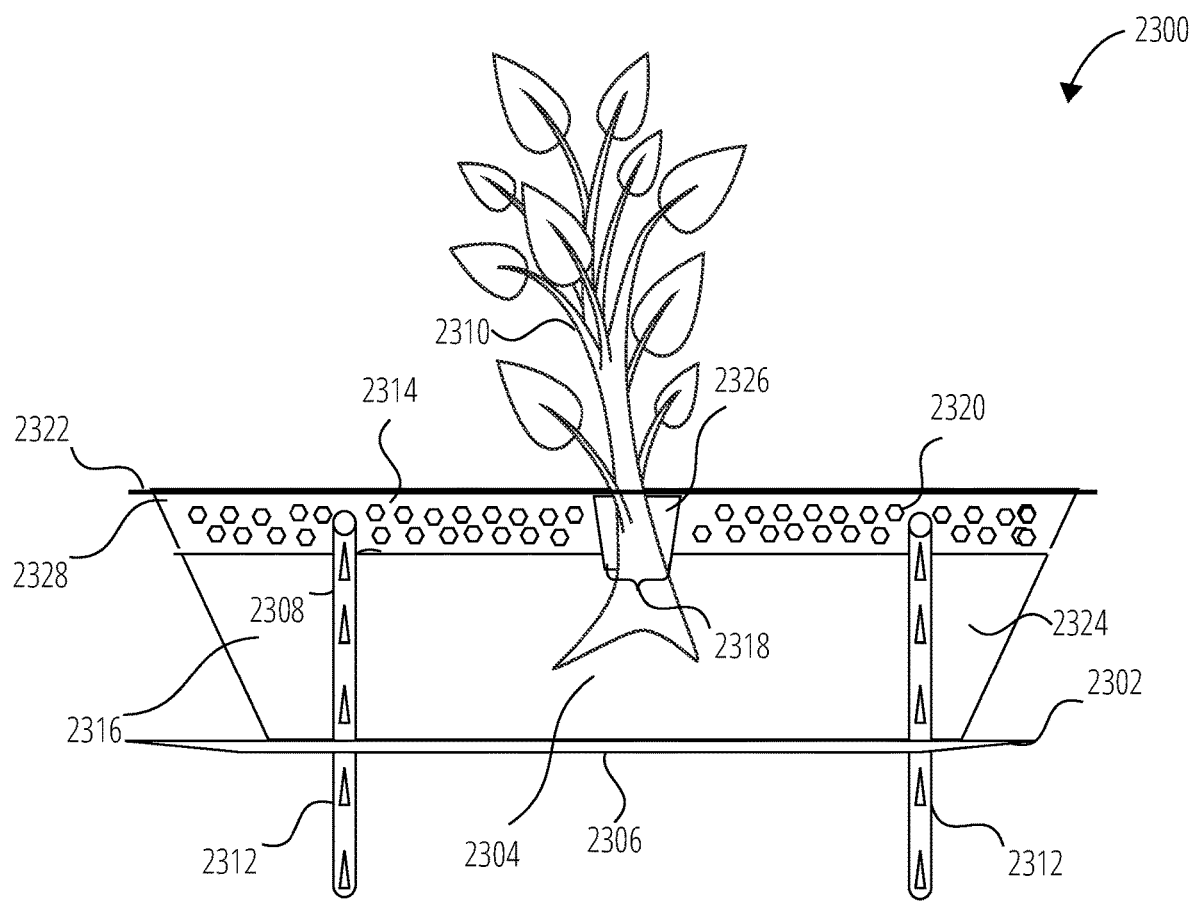
FIG. 23 illustrates a plant vessel with shoots 2300 in accordance with one embodiment.

Referring to FIG. 23, a plant vessel with shoots 2300 is illustrated showing a plant having matured to the point of sending out shoots and establishing roots in a root zone 2304 within the substrate 2316. "Substrate" in this disclosure refers to a biologically and chemically unreactive material that a plant may grow in or on. "Root zone" in this disclosure refers to the area of oxygen and soil (substrate) surrounding the roots of a plant.

As shown, the impervious outer vessel or tray insert 2306 retains its component parts as previously illustrated in FIG. 20, namely the base 2302, cover 2322, top rim 2328, vertically oriented walls 2324, seed pocket 2326, and aperture 2318. Inside the impervious outer vessel or tray insert 2306, the upper nutrient chamber 2314 and lower substrate 2316 are separated by a pervious membrane 2308 and a plurality of nozzles such as raw water nozzle 2312 and raw water nozzle 2312 penetrate the impervious outer vessel or tray insert 2306 base 2302 to feed water to the nutrient chamber 2314, the substrate 2316, or some combination of the two during the fertigation process.

Having germinated and grown, a plant as manifested by a shoot or shoots of plants 2310 extends through the aperture 2318 and seed pocket 2326, sending roots through a root zone 2304 in the substrate 2316. To prevent the shoots of plants 2310 from being damaged by direct contact with the nutrients 2320, a seal is formed at the aperture 2318 when the plant itself pushes through the aperture 2318 into the seed pocket 2326 and further extends its growth above the impervious outer vessel or tray insert 2306.

Figure 24A:
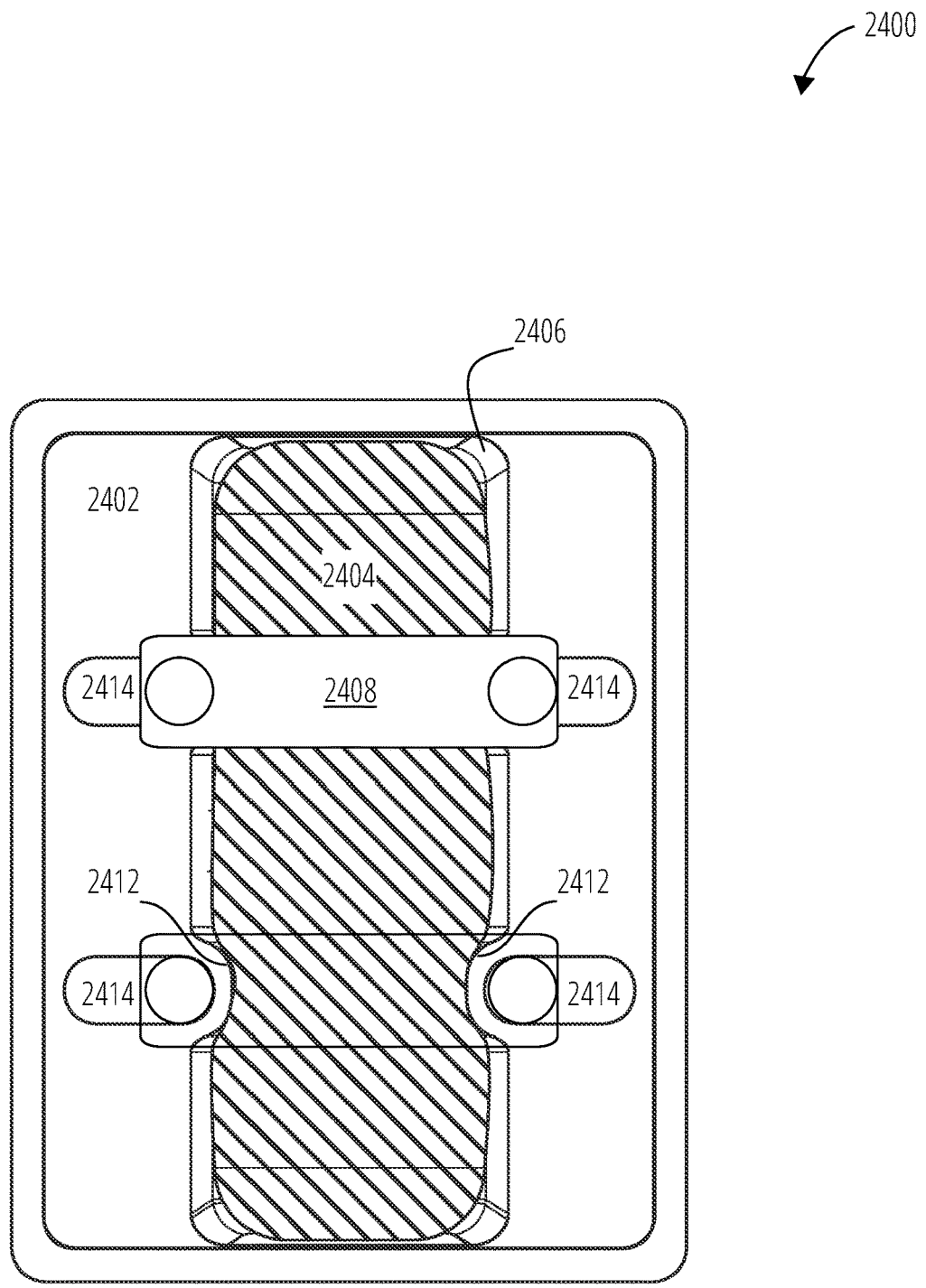
FIG. 24A-FIG. 24B illustrate a tray insert with plant vessel 2400 in accordance with one embodiment.
Figure 24B:
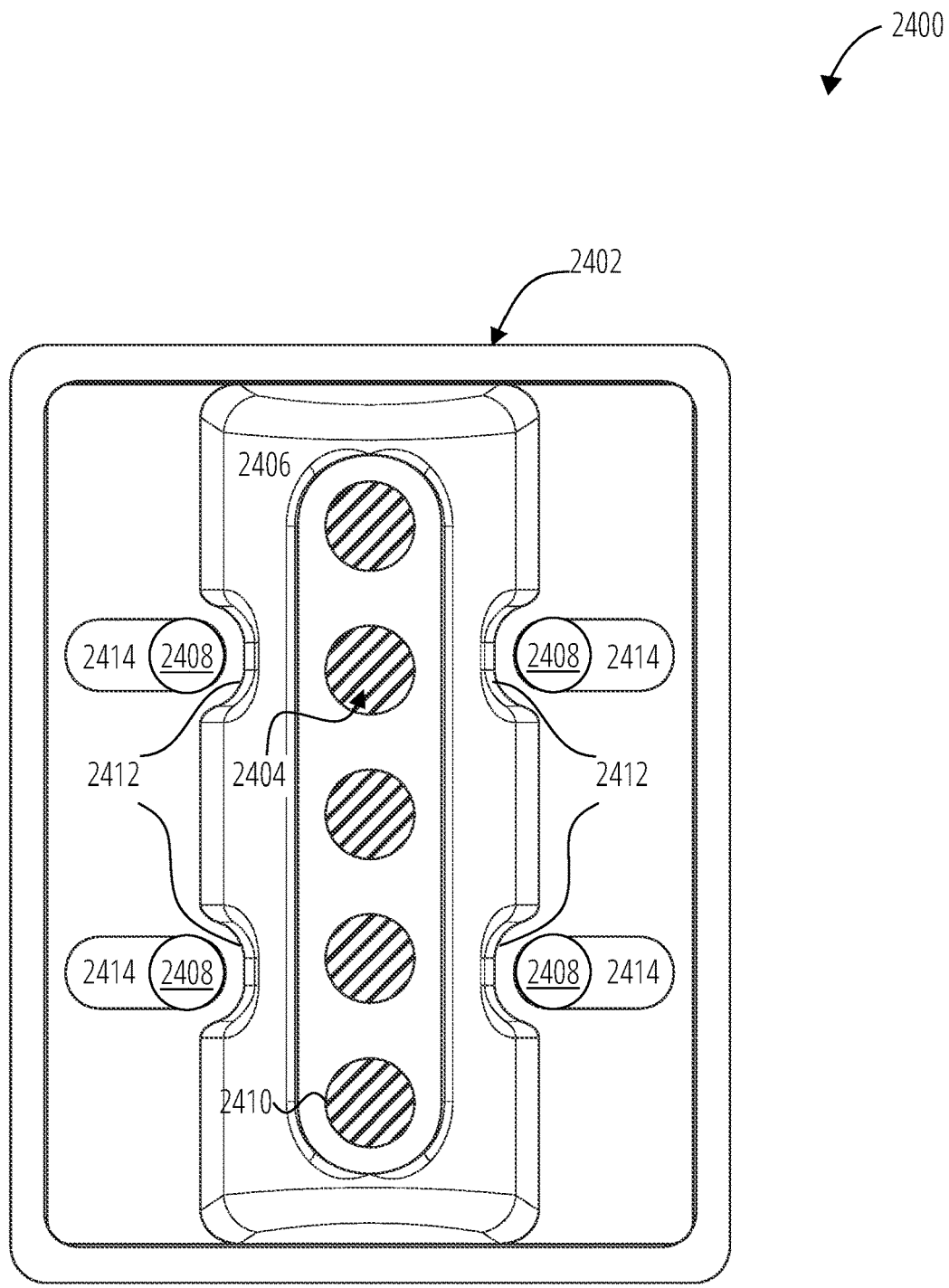

FIG. 24A-FIG. 24B illustrate a tray insert with plant vessel 2400 in accordance with one embodiment. The tray insert with plant vessel 2400 comprises a tray insert 2402 with a plant vessel in place. The plant vessel may be a sausage-type plant vessel 2404 as shown and may rest within the vessel cavity 2406 of the tray insert 2402 as shown.

The pressure ridges 2412 may be seen here exerting an inward pressure on the sausage-type plant vessel 2404 such that the sausage-type plant vessel 2404 may deform around the pressure ridges 2412, increasing the surface area of the sausage-type plant vessel 2404 in contact with the pressure ridges 2412 and thus increasing the friction forces exerted to hold the sausage-type plant vessel 2404 secure within the vessel cavity 2406. Gripper hold-down slots 2414 are also shown which would allow a gripper 2408 to hold the sausage-type plant vessel 2404 in place, as indicated. The gripper 2408 may include portions that span the top of the sausage-type plant vessel 2404 across the vessel cavity 2406 as shown or may include fingers that extend from the bottom of the tray insert 2402 up through the gripper hold-down slot 2414 and over the vessel cavity 2406 in another embodiment, or may be otherwise configured such that the gripper 2408 may exert a downward counterpressure against the pressure from the fertigation needles.

FIG. 24B illustrates a bottom view of the tray insert with plant vessel 2400. The sausage-type plant vessel 2404 may be seen through the fertigation holes 2410 resting on the bottom of the vessel cavity 2406. In this manner, fertigation needles inserted into the fertigation hole 2410 as illustrated in FIG. 15 may contact, pierce, and penetrate the outer membrane of the sausage-type plant vessel 2404, in order to inject water and nutrients (i.e., fertigate) the substrate within the outer membrane, along with the seed or plant contained therein.

Figure 25:
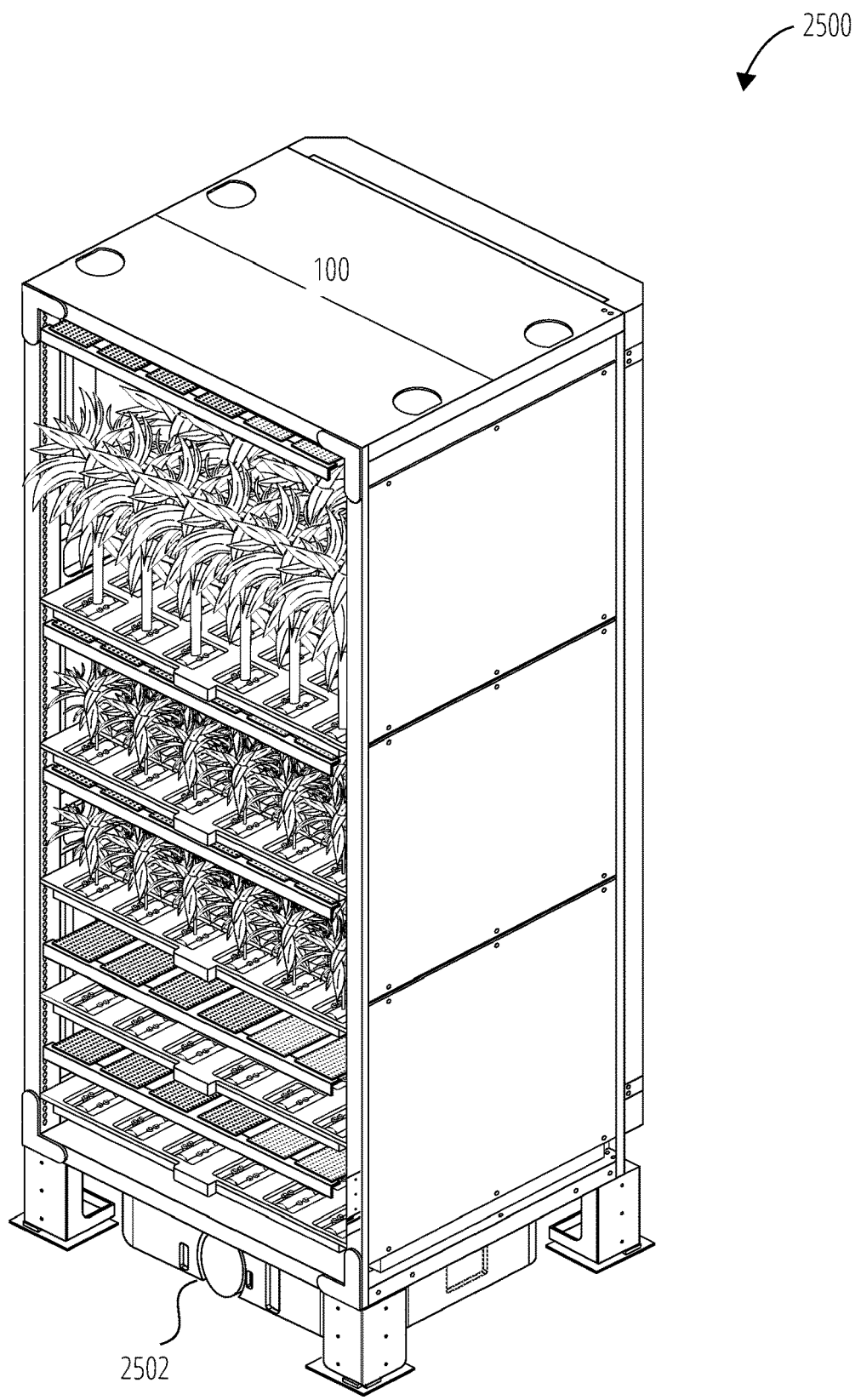
FIG. 25 illustrates a grow module transported via AVG 2500 in accordance with one embodiment.

FIG. 25 illustrates a grow module transported via AVG 2500 in accordance with one embodiment. Grow modules 100 may be transported around an automated growing facility in a number of ways. In one embodiment, a grow module 100 may be transported using an automated guided vehicle (AGV) 2502.

The AGV may be both a lifting and transport system. All aspects of the growing system, including but not limited to: AGV, HVAC, fertigation station, lighting, horizontal airflow, hydration, nutrient composition, carbon dioxide, ozone, oxygen, etc., may be controlled. At any given time, the control system managing these aspects may know the layout and contents of a chamber, the number of modules in that chamber, the location of each module within the chamber, the number of trays within each module, the variety of plants on each tray, the age of each plant within each tray, and the ideal care instructions for each plant within a tray. This inventory of plants (variety, age, location, daily instruction, etc.) may be contained within the control system and may be indexed using QR codes on an individual tray level in one embodiment. By scanning the QR code of each module, and each tray, optimal care data/instruction may be retrieved from the control system and executed by the equipment/system, including how often the AGV needs to fetch a module, to fertigate (feed and irrigate), photograph, adjust lighting verticality, load and unload, package, etc.

Tray level QR codes may be referenced during the removal of trays for fertigation. Module level QR codes may be referenced during transport and may be scanned at various locations to maintain accurate inventory and location of modules, i.e., when presented to the fertigation stations, when presented to a light adjust station, when passing into or out of a chamber, when being harvested or being populated with seeds (load/unload station), when presented to the sterilization chamber, etc. Thus, the plant is a fraction of the tray, the tray is a fraction of the module, the module is a fraction of the chamber, the chamber is a fraction of the facility. The transport of "plants" throughout all areas and phases of a facility may be tracked by QR codes on various hierarchies of the facility/system. QR codes may also be placed along the floor of the facility and scanned by the AGVs to indicate positional data as they move to provide location references to their internal guidance systems. In one embodiment, trays may have radio frequency identification (RFID) tags affixed, instead of utilizing QR codes. RFID tags may also be used on grow modules, but not on trays. Memory data tracking may be used for trays along with RFID tracking in one embodiment.

The methods, apparatuses, and systems in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A method of growing plants, seeds or seedlings, comprising:
   using a fertigation system to extract a growing tray comprising a plurality of plant vessels from a grow module;
   the grow module comprising:
   a plurality of tray modules including a light tray over the growing tray,
   the light tray including:
   a lighting array; and
   at least one sensor; and
   the growing tray adapted to hold the plurality of plant vessels; and
   a machine-readable identification;
   wherein the grow module is configured to hold the plurality of tray modules in a vertically stacked configuration; and
   wherein the lighting array on the light tray configured to provide light to the plurality of plant vessels on the growing tray in the grow module directly under said light tray;
   the fertigation system including:
   a tray movement system for extracting the growing tray from the grow module and placing the growing tray back into the grow module;
   a tray elevator for lowering and raising the growing tray;
   a first pump in fluid communication with at least one of a fresh water supply and a nutrient/water mixture; and
   a nozzle manifold in fluid communication with at least one of the first pump, the fresh water supply, and the nutrient/water mixture,
   the nozzle manifold comprising:
   a manifold header; and
   at least one nozzle in fluid communication with the manifold header, wherein the at least one nozzle is configured to inject at least one of the fresh water supply and the nutrient/water mixture supplied by the first pump into the plurality of plant vessels on the growing tray,
   the plurality of plant vessels including:
   plants, seeds or seedlings; and
   a substrate in a root zone;
   raising or lowering the growing tray toward the plurality of nozzles;
   injecting at least one of nutrients, and the fresh water supply into the plurality of plant vessels; and
   placing the growing tray back into the grow module.

2. The method of claim 1, wherein the at least one sensor measures light, temperature, or humidity within the grow module.

3. The method of claim 1, wherein the machine-readable identification is a barcode, a quick response (QR) code, a radio-frequency identification (RFID) device, or a Near Field Communication (NFC) device.

4. The method of claim 1, further comprising a control system to control at least one of the tray movement system, the tray elevator, the first pump, the lighting array, the at least one fan, the at least one sensor, and the at least one power supply.

5. The method of claim 1, further comprising injecting pressurized air into the root zone using the plurality of nozzles, wherein the nozzle manifold is in fluid communication with the pressurized air.

6. The method of claim 1, wherein the fertigation system further comprises at least one of:
- at least one camera, wherein the at least one camera captures video or images of at least one the plant vessels and seedlings and plants growing in the plant vessels;
- a mixing tank in fluid communication with the fresh water supply;
- a nutrient supply in fluid communication with the mixing tank;
- a second pump in fluid communication with the mixing tank;
- a day tank in fluid communication with the first pump and the second pump; and
- fluid communication between the nozzle manifold and pressurized air.

7. A plant growing system comprising:
a plurality of plant vessels;
a grow module comprising:
- a plurality of tray modules including a light tray over a growing tray;
- the light tray including:
lighting array;
at least one fan;
at least one sensor; and
at least one power supply;
- the growing tray adapted to hold the plurality of plant vessels;
- a grow module base;
- a machine-readable identification on the light tray; and
- a grow rack configured to rest on the grow module base, the grow rack configured to hold the plurality of tray modules in a vertically stacked configuration;
- the lighting array on the light tray providing light to the plurality of plant vessels on the growing tray in the grow rack directly under said light tray;
a fertigation system including:
- a tray movement system for extracting the growing tray from the grow module and placing the growing tray back into the grow module;
- a tray elevator for lowering and raising the growing tray;
- a first pump in fluid communication with a fresh water supply;
- a nozzle manifold in fluid communication with at least one of the first pump and the fresh water supply; and
- the nozzle manifold comprising:
- a manifold header; and
- a plurality of nozzles in fluid communication with the manifold header, wherein the plurality of nozzles are configured to inject at least one of nutrients supplied by the first pump and water from the fresh water supply into the plurality of plant vessels on the growing tray, and
the plurality of plant vessels including:
- an impervious outer vessel including a substrate in a root zone;
- a cover over the impervious outer vessel;
- a pervious membrane in contact with the substrate;
- a nutrient chamber including nutrients, wherein the nutrient chamber is between the cover and the pervious membrane, and the nutrients are in contact with the pervious membrane; and
- a pocket allowing a seed or seedling access to the substrate through an aperture in the cover and the pervious membrane.

8. The plant growing system of claim 7, further comprising a control system to control at least one of the tray movement system, the tray elevator, the first pump, the lighting array, the at least one fan, the at least one sensor, and the at least one power supply.

9. The plant growing system of claim 7, wherein the at least one sensor is configured to measure light, temperature, or humidity within the grow module.

10. The plant growing system of claim 7, wherein the fertigation system further comprises at least one of:
- at least one camera, wherein the at least one camera captures video or images of the plants, or the seeds or seedlings;
- a mixing tank in fluid communication with the fresh water supply;
- a nutrient supply in fluid communication with the mixing tank;
- a second pump in fluid communication with the mixing tank;
- a day tank in fluid communication with the first pump and the second pump; and
- fluid communication between the nozzle manifold and pressurized air.

11. The plant growing system of claim 7, wherein the plurality of nozzles puncture the impervious outer vessel and the pervious membrane of the plant vessels without puncturing the cover.

12. The plant growing system of claim 7, wherein the machine-readable identification is a barcode, a quick response (QR) code, a radio-frequency identification (RFID) device, or a Near Field Communication (NFC) device.

* * * * *